US012804676B2

(12) United States Patent
Taherzadeh Boroujeni et al.

(10) Patent No.: US 12,804,676 B2
(45) Date of Patent: Nov. 17, 2026

(54) SIGNALING FOR DYNAMIC WAVEFORM SWITCHING

(71) Applicant: QUALCOMM Incorporated, San Diego, CA (US)

(72) Inventors: Mahmoud Taherzadeh Boroujeni, San Diego, CA (US); Gokul Sridharan, Sunnyvale, CA (US); Peter Gaal, San Diego, CA (US); Wanshi Chen, San Diego, CA (US); Tao Luo, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 440 days.

(21) Appl. No.: 18/472,780

(22) Filed: Sep. 22, 2023

(65) Prior Publication Data

US 2024/0155641 A1 May 9, 2024

Related U.S. Application Data

(60) Provisional application No. 63/382,339, filed on Nov. 4, 2022.

(51) Int. Cl.

*H04W 72/232* (2023.01)
*H04L 27/26* (2006.01)
*H04W 72/1268* (2023.01)

(52) U.S. Cl.

CPC ....... *H04W 72/232* (2023.01); *H04L 27/2636* (2013.01); *H04W 72/1268* (2013.01)

(58) Field of Classification Search

None

See application file for complete search history.

(56) References Cited

U.S. PATENT DOCUMENTS

| | | | | |
|---|---|---|---|---|
| 2018/0324715 | A1 | 11/2018 | Ryoo et al. | |
| 2023/0131118 | A1* | 4/2023 | Kim | H04W 52/0216 370/311 |
| 2024/0163050 | A1* | 5/2024 | Ahmadzadeh | H04L 5/005 |
| 2024/0283612 | A1* | 8/2024 | Cozzo | H04L 5/0053 |
| 2024/0284451 | A1* | 8/2024 | Park | H04L 5/0094 |

(Continued)

FOREIGN PATENT DOCUMENTS

CN 113572587 A 10/2021

OTHER PUBLICATIONS

International Search Report and Written Opinion—PCT/US2023/036029—ISA/EPO—Apr. 8, 2024.

(Continued)

*Primary Examiner* — Duc T Duong

(74) *Attorney, Agent, or Firm* — Harrity & Harrity, LLP \Qualcomm

(57) ABSTRACT

Wireless communications systems, apparatuses, and methods are provided. A method of wireless communication performed by a user equipment (UE) includes receiving, from a network unit, an indicator indicating dynamic waveform switching between a first waveform type and a second waveform type and monitoring, based on the indicator, for downlink control information (DCI) from the network unit, wherein at least one of a size of the DCI, a size of a bitfield of the DCI, or a location of the bitfield of the DCI is interpreted based on the indicator.

30 Claims, 12 Drawing Sheets

(56) References Cited

U.S. PATENT DOCUMENTS

| | | | | |
|---|---|---|---|---|
| 2024/0349278 | A1* | 10/2024 | Gu | H04L 27/0008 |
| 2024/0373409 | A1* | 11/2024 | Wu | H04W 72/232 |
| 2025/0089065 | A1* | 3/2025 | Matsumura | H04W 72/12 |
| 2025/0168822 | A1* | 5/2025 | Sirajudeen | H04L 5/0044 |
| 2025/0202664 | A1* | 6/2025 | Zhou | H04L 27/2636 |
| 2025/0227697 | A1* | 7/2025 | Wu | H04B 7/0639 |
| 2026/0046077 | A1* | 2/2026 | Xiao | H04L 5/001 |
| 2026/0046892 | A1* | 2/2026 | Shin | H04L 5/00 |
| 2026/0101321 | A1* | 4/2026 | Shibaike | H04L 27/2636 |

OTHER PUBLICATIONS

Partial International Search Report—PCT/US2023/036029—ISA/EPO—Feb. 15, 2024.

ZTE: "Discussion on Dynamic Waveform Switching", R1-2208490, 3GPP TSG RAN WG1 #110bis-e, vol. RAN WG1, No. e-Meeting, Oct. 10, 2022-Oct. 19, 2022, Sep. 30, 2022, pp. 1-5, XP052276416, Sections 1-3.

* cited by examiner

SIGNALING FOR DYNAMIC WAVEFORM SWITCHING

CROSS-REFERENCE TO RELATED APPLICATIONS

The present application claims the benefit of, and priority to, U.S. Provisional Patent Application No. 63/382,339, filed Nov. 4, 2022, the entirety of which is incorporated by reference herein.

TECHNICAL FIELD

This application relates to wireless communication systems, and more particularly, to signaling for dynamic waveform switching in wireless communication systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing may extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR may be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a user equipment (UE) may include receiving, from a network unit, an indicator indicating dynamic waveform switching between a first waveform type and a second waveform type and monitoring, based on the indicator, for downlink control information (DCI) from the network unit, wherein at least one of a size of the DCI, a size of a bitfield of the DCI, or a location of the bitfield of the DCI is interpreted based on the indicator.

In an additional aspect of the disclosure, a method of wireless communication performed by a user equipment (UE) may include receiving, from a network unit, a first indicator indicating dynamic waveform switching between a first waveform type and a second waveform type and receiving, from the network unit based on the first indicator, a second indicator indicating to switch between the first waveform type and the second waveform type.

In an additional aspect of the disclosure, a method of wireless communication performed by a network unit may include transmitting, to a user equipment (UE), an indicator indicating dynamic waveform switching between a first waveform type and a second waveform type and transmitting, to the UE based on the indicator, downlink control information (DCI), wherein at least one of a size of the DCI, a size of a bitfield of the DCI, or a location of the bitfield of the DCI is interpreted based on the indicator.

In an additional aspect of the disclosure, a method of wireless communication performed by a network unit may include transmitting, to a user equipment (UE), a first indicator indicating dynamic waveform switching between a first waveform type and a second waveform type and transmitting, to the UE based on the first indicator, a second indicator indicating to switch between the first waveform type and the second waveform type.

In an additional aspect of the disclosure, a user equipment (UE) may include a memory; a transceiver; and at least one processor coupled to the memory and the transceiver, wherein the UE is configured to receive, from a network unit, an indicator indicating dynamic waveform switching between a first waveform type and a second waveform type and monitor, based on the indicator, for downlink control information (DCI) from the network unit, wherein at least one of a size of the DCI, a size of a bitfield of the DCI, or a location of the bitfield of the DCI is interpreted based on the indicator.

In an additional aspect of the disclosure, a user equipment (UE) may include a memory; a transceiver; and at least one processor coupled to the memory and the transceiver, wherein the UE is configured to receive, from a network unit, a first indicator indicating dynamic waveform switching between a first waveform type and a second waveform type and receive, from the network unit based on the first indicator, a second indicator indicating to switch between the first waveform type and the second waveform type.

In an additional aspect of the disclosure, a network unit may include a memory; a transceiver; and at least one processor coupled to the memory and the transceiver, wherein the network unit is configured to transmit, to a user equipment (UE), an indicator indicating dynamic waveform switching between a first waveform type and a second waveform type and transmit, to the UE based on the indicator, downlink control information (DCI), wherein at least one of a size of the DCI, a size of a bitfield of the DCI, or a location of the bitfield of the DCI is interpreted based on the indicator.

In an additional aspect of the disclosure, a network unit may include a memory; a transceiver; and at least one processor coupled to the memory and the transceiver, wherein the network unit is configured to transmit, to a user equipment (UE), a first indicator indicating dynamic waveform switching between a first waveform type and a second waveform type and transmit, to the UE based on the first indicator, a second indicator indicating to switch between the first waveform type and the second waveform type.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention may include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances may be implemented in various devices, systems, and methods.

DETAILED DESCRIPTION

Figure 1:
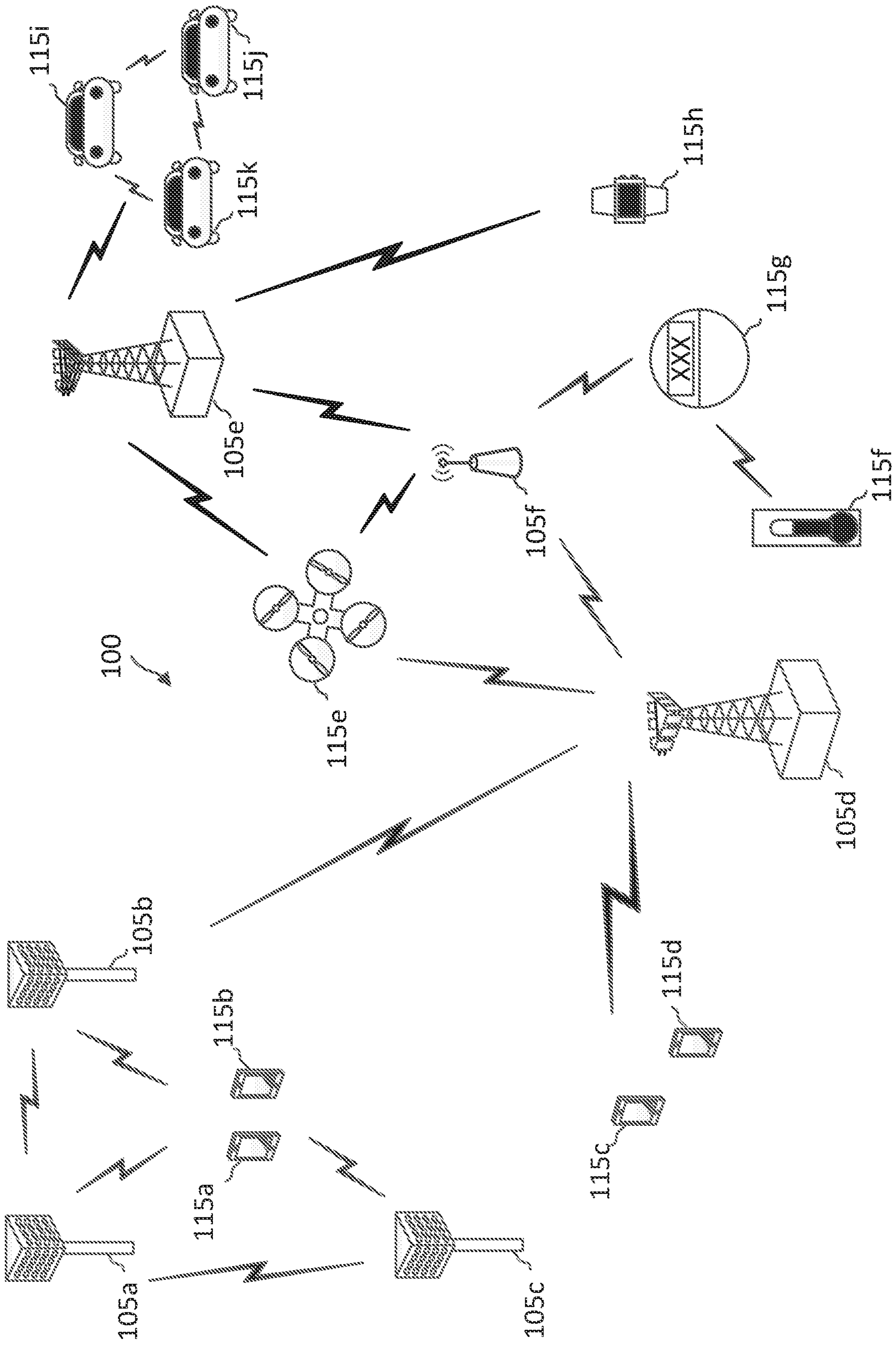
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U may also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNIT) radio band has a minimum OCB requirement of about at least 70 percent (%).

Some sidelink systems may operate over a 20 MHz bandwidth, e.g., for listen before talk (LBT) based channel accessing, in an unlicensed band. A BS may configure a sidelink resource pool over one or multiple 20 MHz LBT sub-bands for sidelink communications. A sidelink resource pool is typically allocated with multiple frequency subchannels within a sidelink band width part (SL-BWP) and a sidelink UE may select a sidelink resource (e.g., one or multiple subchannel) in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Various aspects relate generally to wireless communication and more particularly to signaling for dynamic waveform switching. Some aspects more specifically relate to a network unit signaling a user equipment (UE) to switch between a first waveform type and a second waveform type for uplink communications. In some examples, a network unit may transmit an indicator to the UE to enable switching between the waveform types. When waveform switching is enabled, the network unit may transmit DCI to the UE indicating which waveform type to use for uplink communications. In some examples, the size of the DCI may be the same size for the first waveform type and the second waveform type. As such, the UE may blind decode the DCI using a common DCI size for the first waveform type and the second waveform type. The DCI may further include scheduled resources for a physical uplink shared channel (PUSCH) communication associated with the UE. The UE may transmit PUSCH communications to the network unit via the scheduled resources using the indicated waveform type.

Additionally or alternatively, the UE may switch between the first waveform type and the second waveform type on a semi-static basis. In some examples, a network unit may transmit an indicator to the UE to enable switching between the waveform types. When waveform switching is enabled, the network unit may transmit non-uplink scheduling DCI and/or a MAC-CE communication to the UE indicating which waveform type to use for uplink communications. The network unit may subsequently transmit uplink scheduling DCI to the UE using a DCI size associated with the previously indicated waveform type. The DCI size associated with the first waveform type may be different from the DCI associated with the second waveform type. As such, the UE may blind decode the DCI based on the DCI size associated with the indicated waveform type. The UE may transmit PUSCH communications to the network unit via the scheduled resources using the indicated waveform type.

Particular aspects of the subject matter described in this disclosure may be implemented to realize one or more of the following potential advantages. In some examples, by implementing dynamic waveform switching according to embodiments of the present disclosure, the described techniques may be used to reduce computing resources, memory requirements, latency, and/or power consumption in the UE by blind decoding a DCI having a common size for the first and second waveform types as compared to blind decoding a first DCI associated with the first waveform type and blind decoding a second, different sized DCI associated with the second waveform type. The dynamic waveform switching according to embodiments of the present disclosure may increase network coverage and/or network capacity. For example, the UE may switch to transmitting uplink communications using a DFT-s-OFDM waveform to increase range and coverage. In some examples, the UE may switch to transmitting uplink communications using a CP-OFDM waveform to increase throughput and/or data rate.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs **105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105** may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs **115*a*-115*d* are examples of mobile smart phone-type devices accessing network 100. A UE 115** may also be a machine specifically configured for connected communication, including machine type communication (MTC), enhanced MTC (eMTC), narrowband IoT (NB-IoT)

and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a vehicle (e.g., a car, a truck, a bus, an autonomous vehicle, an aircraft, a boat, etc.). Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. In some aspects, the UE 115*h* may harvest energy from an ambient environment associated with the UE 115*h*. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes, for example, about 10. Each subframe may be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RS s) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs)

over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 may perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 may enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115 may receive an indicator from the BS 105 indicating dynamic waveform switching between a first waveform type and a second waveform type. The UE 115 may monitor, based on the indicator, for downlink control information (DCI) from the network unit, wherein at least one of a size of the DCI, a size of a bitfield of the DCI, or a location of the bitfield of the DCI is interpreted based on the indicator.

In some aspects, the UE 115 may receive, from the BS 105, a first indicator indicating dynamic waveform switching between a first waveform type and a second waveform type. The UE 115 may receive, from the BS 105 based on the first indicator, a second indicator indicating to switch between the first waveform type and the second waveform type.

Figure 2:
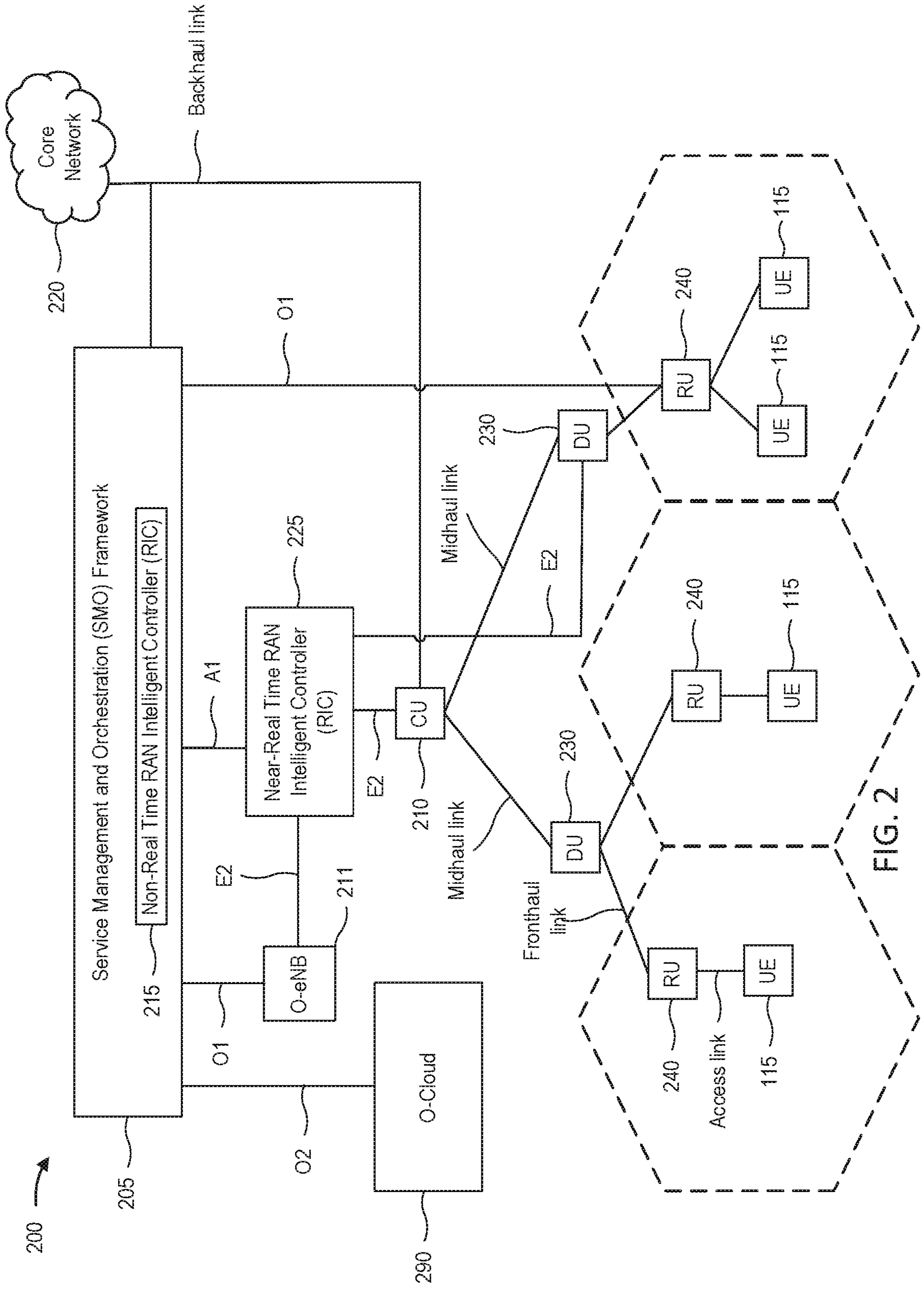
FIG. 2 illustrates an example disaggregated base station architecture according to some aspects of the present disclosure.

FIG. 2 shows a diagram illustrating an example disaggregated base station 200 architecture. The disaggregated base station 200 architecture may include one or more central units (CUs) 210 that may communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 may be logically split into one or more CU-UP units and one or more CU-CP units. The CU-UP unit may communicate bidirectionally with the CU-CP unit via an interface, such as the E1 interface when implemented in an O-RAN configuration. The CU 210 may be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) may be implemented with an interface configured to communicate signals with other layers (and modules) hosted by the DU 230, or with the control functions hosted by the CU 210.

Lower-layer functionality may be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 may be implemented to handle over the air (OTA) communication with one or more UEs 115. In some implementations, real-time and non-real-time aspects of control and user plane communication with the RU(s) 240 may be controlled by the corresponding DU 230. In some scenarios, this configuration may enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements may include CUs 210, DUs 230, RUs 240 and Near-RT RICs 225. In some implementations, the SMO Framework 205 may communicate with a hardware aspect of a 4G RAN, such as an open eNB (O-eNB) 211, via an O1 interface. Additionally, in some implementations, the SMO Framework 205 may communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

In some aspects, the UE 115 may receive an indicator from the RU 240 indicating dynamic waveform switching between a first waveform type and a second waveform type. The UE 115 may monitor, based on the indicator, for downlink control information (DCI) from the RU 240, wherein at least one of a size of the DCI, a size of a bitfield of the DCI, or a location of the bitfield of the DCI is interpreted based on the indicator.

In some aspects, the UE 115 may receive, from the RU 240, a first indicator indicating dynamic waveform switching between a first waveform type and a second waveform type. The UE 115 may receive, from the RU 240 based on the first indicator, a second indicator indicating to switch between the first waveform type and the second waveform type.

Figure 3:
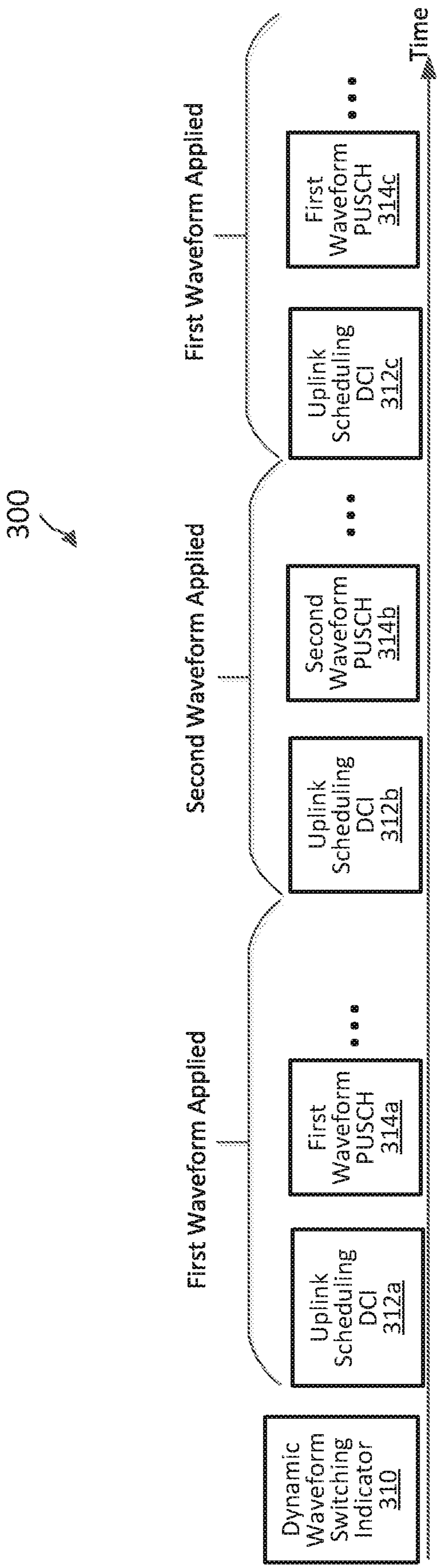
FIG. 3 illustrates a waveform switching timeline in a wireless communication network according to some aspects of the present disclosure.

FIG. 3 illustrates a waveform switching timeline 300 in a wireless communication network (e.g., network 100 and/or network 200) according to some aspects of the present disclosure. In FIG. 3, the horizontal axis may represent time in some arbitrary units. In some aspects, a UE (e.g., the UE 115 or the UE 700) may receive a dynamic waveform switching indicator 310 from a network unit (e.g., the network unit 800, the BS 105, the RU 240, the DU 230, and/or the CU 210) indicating dynamic waveform switching between a first waveform type and a second waveform type. In this regard, the UE may receive the dynamic waveform switching indicator 310 via at least one of a radio resource control (RRC) message, a medium access control control element (MAC-CE) communication, or other suitable communication. For example, the RRC message, MAC-CE communication, or other suitable communication MAC-CE may include codepoint(s) indicating the enablement of dynamic waveform switching.

In some aspects, the first waveform type may include a discrete Fourier transform spread orthogonal frequency division multiplexing (DFT-s-OFDM) waveform or other suitable waveform type. The second waveform type may include a cyclic-prefix OFDM (CP-OFDM) waveform or other suitable waveform type. The dynamic waveform switching may enable the UE to maximize network coverage and/or network capacity. For example, the UE may switch to transmitting uplink communications using a DFT-s-OFDM waveform to increase range and coverage. In some aspects, the UE may switch to transmitting uplink communications using a CP-OFDM waveform to increase throughput and/or data rate.

In some aspects, the UE may monitor for uplink scheduling downlink control information (DCI) 312 from the network unit. The UE may monitor for the DCI 312 based on the dynamic waveform switching indicator 310. In some aspects, the size of the DCI 312, a size of a bitfield of the DCI 312, or a location of the bitfield of the DCI 312 may be interpreted based on the indicator. The DCI 312*a* and 312*c* may be associated with the first waveform type. The DCI 312*b* may be associated with the second waveform type. In some aspects, the size of the DCI 312 may be the same (e.g., a common size) when the DCI 312*a* and 312*c* are associated with the first waveform type and when the DCI 312*b* is associated with the second waveform type. However, the size of the bitfield of the DCI 312 may be different when the DCI 312*a* and 312*c* are associated with the first waveform type compared to when the DCI 312*b* is associated with the second waveform type. Additionally or alternatively, the location of the bitfield of the DCI 312 may be different when the DCI 312*a* and 312*c* are associated with the first waveform type compared to when the DCI 312*b* is associated with the second waveform type. The UE may interpret the size of the DCI 312, the size of the bitfield of the DCI 312, and/or the location of the bitfield of the DCI 312 based on whether the DCI 312 is associated with the first waveform type or the second waveform type.

In some aspects, the dynamic waveform switching indicator 310 may further indicate the size of the DCI 312. The size of the DCI 312 may be a maximum size of a DCI 312 associated with the first waveform type or a size of a DCI 312 associated the second waveform type. For example, if the default (e.g., legacy) size of the DCI associated with the first waveform type is x and the default (e.g., legacy) size of the DCI associated with the second waveform type is x+y, the size of the dynamic waveform switching DCI 312 may be x+y. Additionally or alternatively, if the default (e.g., legacy) size of the DCI associated with the second waveform type is x and the default (e.g., legacy) size of the DCI associated with the first waveform type is x+y, the size of the dynamic waveform switching DCI 312 may be x+y.

In some aspects, the UE may monitor for the DCI 312 by blind decoding a search space based on the size of the DCI 312. Since the size of the dynamic waveform switching DCI 312 is the same for the first waveform type and the second waveform type, the UE may monitor for a single size (e.g., a common size) DCI 312. The UE may reduce computing resources and/or power consumption by blind decoding a DCI 312 having a common size for the first and second waveform types as compared to blind decoding a first DCI associated with the first waveform type and blind decoding a second, different sized DCI associated with the second waveform type.

In some aspects, the bitfield of the DCI 312 may include at least one zero padding bit. For example, when the size of the dynamic waveform switching DCI 312 is x+y based on the default (e.g., legacy) size of the DCI associated with the first waveform type being x and the default (e.g., legacy) size of the DCI associated with the second waveform type being x+y. The dynamic waveform switching DCI 312 may include y zero padding bits when the dynamic waveform switching DCI 312 is associated with the first waveform type.

In some aspects, the dynamic waveform switching DCI 312 may repurpose bitfield(s) of a default (e.g. legacy) DCI. For example, the bitfield of the DCI 312 may include a row/column of a time domain resource allocation (TDRA) table, a row/column of a frequency domain resource allocation (FDRA) table, a row/column of a modulation and coding scheme (MCS) table, or other suitable repurposed bitfield.

In some aspects, the size of the DCI 312 may be based on a format of the DCI (e.g., DCI format 0_0, 0_1, 1_0, 1_1, 2_0, 2_1, 2_2, or 2_3). For example, a first DCI format may indicate a first DCI 312 size while a second DCI format may indicate a second, different DCI 312 size. In some aspects, the size of the bitfield of the DCI 312 may be based on the format of the DCI 312. In some aspects, the location of the bitfield of the DCI 312 may be based on the format of the DCI 312.

In some aspects, the UE may receive the DCI 312 from the network unit based on blind decoding the DCI 312. The DCI 312 may indicate scheduled resources (e.g., time resources and/or frequency resources) for a physical uplink shared channel (PUSCH) communication 314 associated with the UE. The DCI 312 may indicate whether the PUSCH communication 314 should be transmitted using the first waveform type or the second waveform type. For example, the scheduling information may explicitly indicate and/or implicitly indicate the PUSCH communication 314 should be transmitted using the first waveform type or the second waveform type. The scheduling information that implicitly indicates the PUSCH communication 314 should be transmitted using the first waveform type or the second waveform type may include a resource allocation (RA) type, the most significant bit of the RA, the number of resource blocks in the scheduled resources, the location (e.g., frequency sub-channels, slot indexes) of the resource blocks, an MCS associated with the scheduled resources, the number of PUSCH communication 314 repetitions, the number of demodulation reference signals (DMRS) code division multiplexed (CDM) groups without data, precoding information, the number of layers, sounding reference signal resource indicator (SRI), and/or other suitable scheduling information.

In some aspects, the UE may transmit the PUSCH communication 314 to the network unit using the indicated waveform type via the scheduled resources. For example, the UE may receive uplink scheduling DCI 312*a* indicating resources and first waveform type for PUSCH communication 314*a*. The UE may transmit PUSCH communication(s) 314*a* to the network unit using the first waveform type via the scheduled resources. The UE may subsequently receive uplink scheduling DCI 312*b* indicating resources and second waveform type for PUSCH communication 314*b*. The UE may transmit PUSCH communication(s) 314*b* to the network unit using the second waveform type via the scheduled resources. The UE may subsequently receive uplink scheduling DCI 312*c* indicating resources and first waveform type for PUSCH communication 314*c*. The UE may transmit PUSCH communication(s) 314*c* to the network unit using the first waveform type via the scheduled resources.

Figure 4:
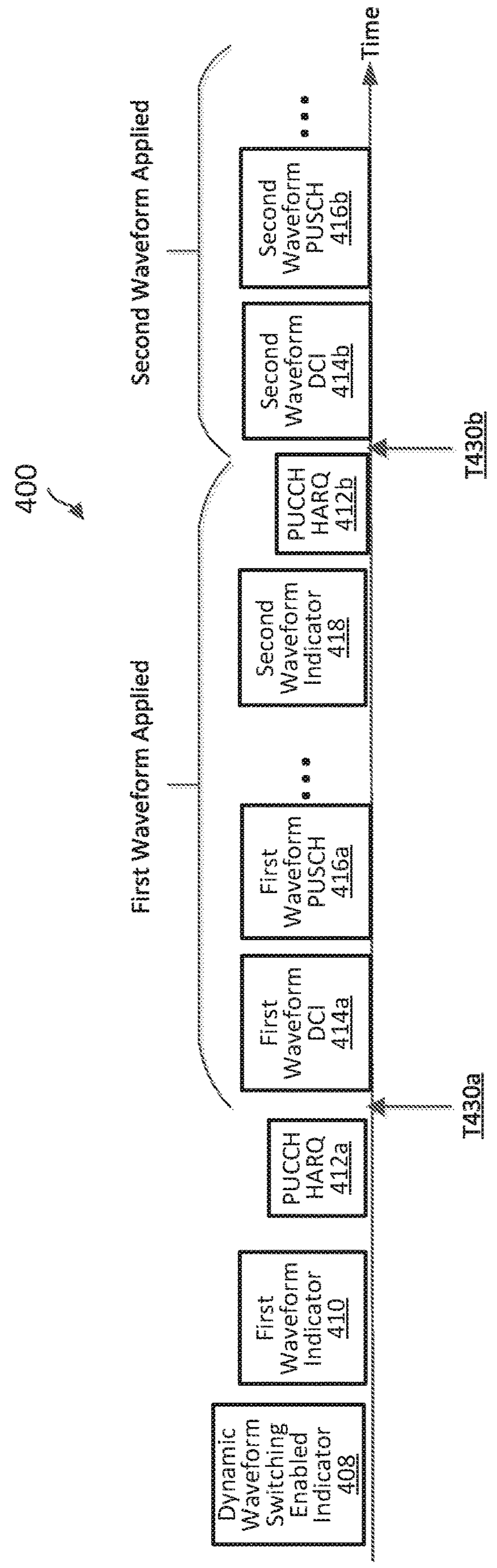
FIG. 4 illustrates a waveform switching timeline in a wireless communication network according to some aspects of the present disclosure.

FIG. 4 illustrates a waveform switching timeline 400 in a wireless communication network (e.g., network 100 and/or network 200) according to some aspects of the present disclosure. In FIG. 4, the horizontal axis may represent time in some arbitrary units. In some aspects, a UE (e.g., the UE 115 or the UE 700) may receive a dynamic waveform switching enabled indicator 408 from a network unit (e.g., the network unit 800, the BS 105, the RU 240, the DU 230, and/or the CU 210) indicating dynamic waveform switching is enabled between a first waveform type and a second waveform type. In this regard, the UE may receive the dynamic waveform switching enabled indicator 408 via at least one of a radio resource control (RRC) message, a medium access control control element (MAC-CE) communication, or other suitable communication. For example, the RRC message, MAC-CE communication, or other suitable communication MAC-CE may include codepoint(s) indicating the dynamic waveform switching is enabled.

In some aspects, the UE may receive a first waveform indicator 410 from the network unit indicating to switch to the first waveform type. The dynamic waveform switching enabled indicator 408 may enable the UE waveform type switching while the first waveform indicator 410 and second waveform indicator 418 may indicate which waveform type to switch to for uplink communications.

In some aspects, the first waveform indicator 410 and second waveform indicator 418 may include non-uplink communication scheduling downlink control information (DCI). Non-uplink communication scheduling DCI may be DCI that includes an indicator of which waveform type to switch to but does not include scheduling resources for uplink communications. Additionally or alternatively, the first waveform indicator 410 and second waveform indicator 418 may be included in a MAC-CE communication.

In some aspects, the UE may receive the first waveform indicator 410 and second waveform indicator 418 on a semi-persistent (e.g., semi-static) basis. For example, the waveform type indicated by the first waveform indicator 410 and second waveform indicator 418 may be valid until the waveform type is switched based on the UE receiving a subsequent waveform indicator. For example, the UE may receive the first waveform indicator 410 and apply the first waveform to PUSCH communication(s) 416 until the UE receives the second waveform indicator 418 and applies the second waveform to PUSCH communication(s) 424.

The waveform type indicated by the first waveform indicator 410 and second waveform indicator 418 may be valid for a period of time until a subsequent first waveform indicator 410 or second waveform indicator 418 switches the waveform type. The time period may include one or more slots, sub-frames, frames, or other time period (e.g., a number of milliseconds). In some aspects, the waveform type may be switched based on UE conditions. For example, the waveform type may be switched to CP-OFDM waveform when the UE is scheduled to transmit uplink communications requiring a high data rate. In some aspects, the waveform type may be switched to DFT-s-OFDM waveform when the UE is located at a cell edge.

The UE may switch to the waveform type indicated by the first waveform indicator 410 and second waveform indicator 418 after transmitting a PUCCH HARQ-ACK communication 412 to the network unit indicating successful receipt (e.g., decoding) of the first waveform indicator 410 or the second waveform indicator 418. For example, the UE may switch to the first waveform type indicated by the first waveform indicator 410 after a preconfigured (e.g., predefined) time period concluding at time T430a after transmitting the PUCCH HARQ-ACK communication 412*a*. For example, the UE may switch to the second waveform type indicated by the second waveform indicator 418 after a preconfigured (e.g., predefined) time period concluding at time T430b after transmitting the PUCCH HARQ-ACK communication 412*b*.

In some aspects, the UE may receive DCI 414 from the network unit indicating scheduled resources for a PUSCH communication 416 associated with the UE. The UE may transmit one or more PUSCH communications 416 to the network unit via the scheduled resources using the first waveform type or the second waveform type based on the waveform type indicated by the first waveform indicator 410 or the second waveform indicator 418.

In some aspects, the DCI 414 may indicate scheduled resources for the PUSCH communication 416. The DCI 414 may have a DCI size associated with the first waveform type (e.g., a legacy first waveform DCI size) or a DCI size associated with the second waveform type (e.g., a legacy second waveform DCI size). The DCI size associated with the second waveform type may be different from the DCI size associated with the first waveform type. When the first waveform indicator 410 indicates the first waveform type, the UE may monitor for the DCI 414*a* by blind decoding a search space based on the size of the DCI 414*a* associated with the first waveform type. When the second waveform indicator 418 indicates the second waveform type, the UE may monitor for the DCI 414*b* by blind decoding a search space based on the size of the DCI 414*b* associated with the second waveform type. In this way, the UE may reduce computing resources and/or power consumption by blind decoding only a single size of DCI 414 as compared to blind decoding two different sized DCIs.

In some aspects, the DCI 414 indicating the scheduled resources for the PUSCH communication 416 may include a size of a bitfield of the DCI 414*a* associated with the first waveform type (e.g., a legacy bitfield size of the first waveform type) or a size of a bitfield of the DCI 414*b* associated with the second waveform type (e.g., a legacy bitfield size of the second waveform type). The size of the bitfield of the DCI 414*b* associated with the second waveform type may be different from the size of the bitfield of the DCI 414*a* associated with the first waveform type. When the first waveform indicator 410 indicates the first waveform type, the UE may interpret the bitfield based on the size of the bitfield of the DCI 414*a* associated with the first waveform type. When the second waveform indicator 418 indicates the second waveform type, the UE may interpret the bitfield based on the size of the bitfield of the DCI 414*b* associated with the second waveform type.

In some aspects, the DCI 414 indicating the scheduled resources for the PUSCH communication 416 may include a location of a bitfield of the DCI 414*a* associated with the first waveform type (e.g., legacy bitfield location of the first waveform type) or a location of a bitfield of the DCI 414*b* associated with the second waveform type (e.g., legacy bitfield location of the second waveform type). The location of the bitfield of the DCI 414*b* associated with the second waveform type may be different from the location of the bitfield of the DCI 414*a* associated with the first waveform type. When the first waveform indicator 410 indicates the first waveform type, the UE may interpret the location of the bitfield based on the location of the bitfield of the DCI 414*a* associated with the first waveform type. When the second waveform indicator 418 indicates the second waveform type, the UE may interpret the location of the bitfield based on the location of the bitfield of the DCI 414*b* associated with the second waveform type.

In some aspects, the UE may transmit the PUSCH communication(s) 416 using the indicated waveform type via the scheduled resources. The UE may transmit the PUSCH communication(s) 416 using the indicated waveform type until the UE receives a subsequent indicator indicating to switch the waveform type. For example, the UE may receive dynamic waveform switching enabled indicator 408 to enable waveform type switching. The UE may receive the first waveform indicator 410 indicating to use the first waveform type for UL communications. The UE may acknowledge receipt of the first waveform indicator by transmitting PUCCH HARQ 412*a* to the network unit. After a delay, the UE may apply the first waveform at time T430a. The UE may receive first waveform DCI 414*a* scheduling resources for PUSCH communication(s) 416*a*. The UE may transmit PUSCH communication(s) using the first waveform until receiving the second waveform indicator 418. The UE may receive second waveform indicator 418 indicating to use the second waveform type for UL communications. The UE may acknowledge receipt of the second waveform indicator by transmitting PUCCH HARQ 412*b* to the network unit. After a delay, the UE may apply the second waveform at time T430b. The UE may receive second waveform DCI 414*b* scheduling resources for PUSCH communication(s) 416*b*. The UE may transmit PUSCH communication(s) 416*b* using the second waveform and the scheduled resources.

Figure 5:
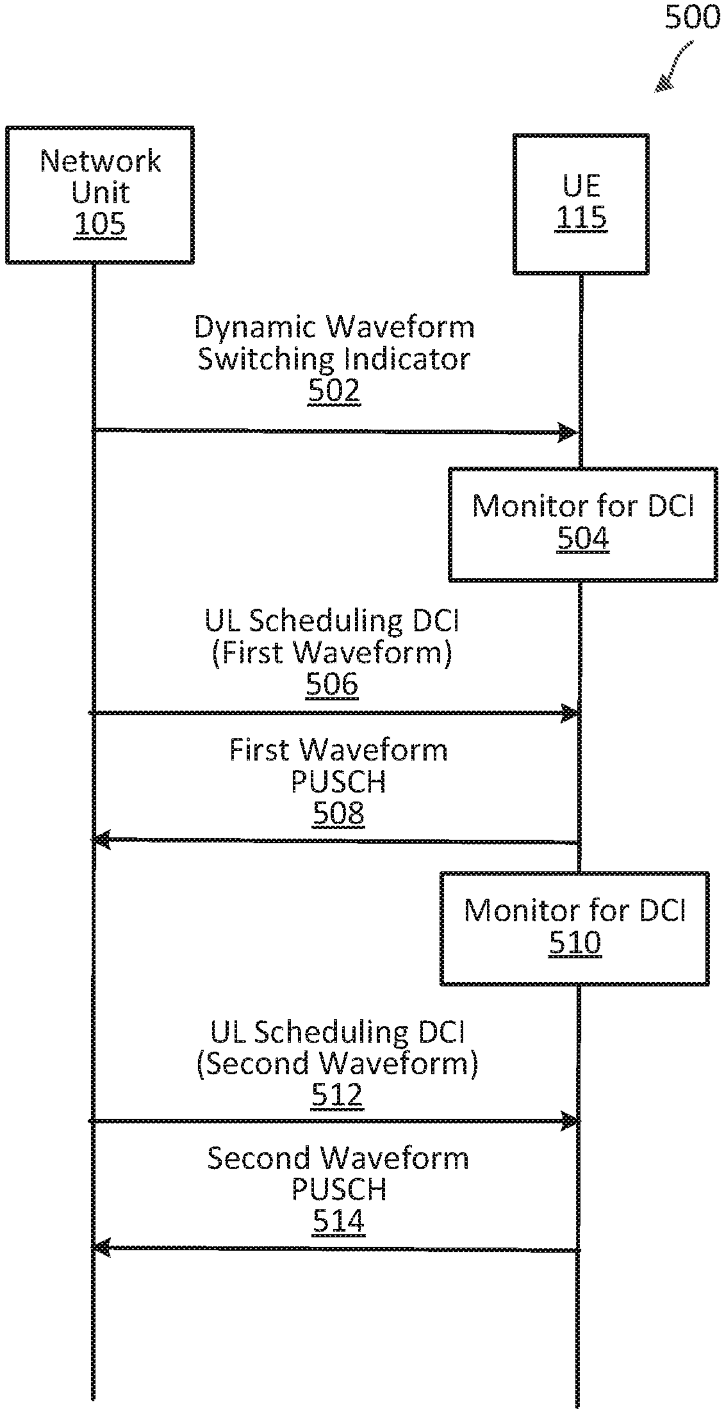
FIG. 5 is a signal flow diagram of a communication method according to some aspects of the present disclosure.

FIG. 5 is a flow diagram of a communication method 500 according to some aspects of the present disclosure. Aspects of the method 500 may be executed by a computing device (e.g., a processor, processing circuit, and/or other suitable component) of a wireless communication device or other suitable means for performing the actions. For example, a wireless communication device, such as the BS 105, the RU 240, the DU 230, the CU 210, and/or the network unit 800, may utilize one or more components, such as the processor 802, the memory 804, the waveform switching module 808, the transceiver 810, the modem 812, and the one or more antennas 816, to execute aspects of method 500. For example, a wireless communication device, such as the UE 115 or the UE 700 may utilize one or more components, such as the processor 702, the memory 704, the waveform switching module 708, the transceiver 710, the modem 712, and the one or more antennas 716, to execute aspects of method 500. The method 500 may employ similar mechanisms as in the networks 100 or 200 and the aspects and actions described with respect to FIGS. 3-4. As illustrated, the method 500 includes a number of enumerated actions, but the method 500 may include additional actions before, after, and in between the enumerated actions. In some aspects, one or more of the enumerated actions may be omitted or performed in a different order.

At action 502, the network unit 105 may transmit a dynamic waveform switching indicator to the UE 115 indicating dynamic waveform switching between a first waveform type and a second waveform type. In this regard, the UE 115 may receive the indicator via at least one of a radio resource control (RRC) message, a medium access control control element (MAC-CE) communication, or other suitable communication. For example, the RRC message, MAC-CE communication, or other suitable communication MAC-CE may include codepoint(s) indicating the enablement of dynamic waveform switching.

At action 504, the UE 115 may monitor for DCI. In some aspects, the UE 115 may monitor for the DCI by blind decoding a search space based on the size of the DCI. Since the size of the dynamic waveform switching DCI is the same for the first waveform type and the second waveform type, the UE 115 may monitor for a single size (e.g., a common size) DCI. The UE 115 may reduce computing resources and/or power consumption by blind decoding a DCI having a common size for the first and second waveform types as compared to blind decoding a first DCI associated with the first waveform type and blind decoding a second, different sized DCI associated with the second waveform type.

At action 506, the network unit 105 may transmit an uplink scheduling DCI to the UE 115. The uplink scheduling DCI may indicate scheduled resources for PUSCH communication(s) using the first waveform. The DCI may indicate scheduled resources (e.g., time resources and/or frequency resources) for a physical uplink shared channel (PUSCH) communication associated with the UE 115. The DCI may indicate whether the PUSCH should be transmitted using the first waveform type or the second waveform type. For example, the scheduling information may explicitly indicate and/or implicitly indicate the PUSCH communication should be transmitted using the first waveform type or the second waveform type. The scheduling information that implicitly indicates the PUSCH communication should be transmitted using the first waveform type or the second waveform type may include a resource allocation (RA) type, the most significant bit of the RA, the number of resource blocks in the scheduled resources, the location (e.g., frequency subchannels, slot indexes) of the resource blocks, an MCS associated with the scheduled resources, the number of PUSCH communication repetitions, the number of demodulation reference signals (DMRS) code division multiplexed (CDM) groups without data, precoding information, the number of layers, sounding reference signal resource indicator (SRI), and/or other suitable scheduling information.

At action 508, the UE 115 may transmit PUSCH communication(s) using the first waveform. The UE may transmit PUSCH communication(s) using the first waveform via the scheduled resources received at action 506.

At action 510, the UE 115 may monitor for DCI by blind decoding a search space based on the size of the DCI.

At action 512, the network unit 105 may transmit an uplink scheduling DCI to the UE 115. The uplink scheduling DCI may indicate scheduled resources for PUSCH communication(s) using the second waveform.

At action 514, the UE 115 may transmit PUSCH communication(s) using the second waveform. The UE 115 may transmit PUSCH communication(s) using the second waveform via the scheduled resources received at action 512.

Figure 6:
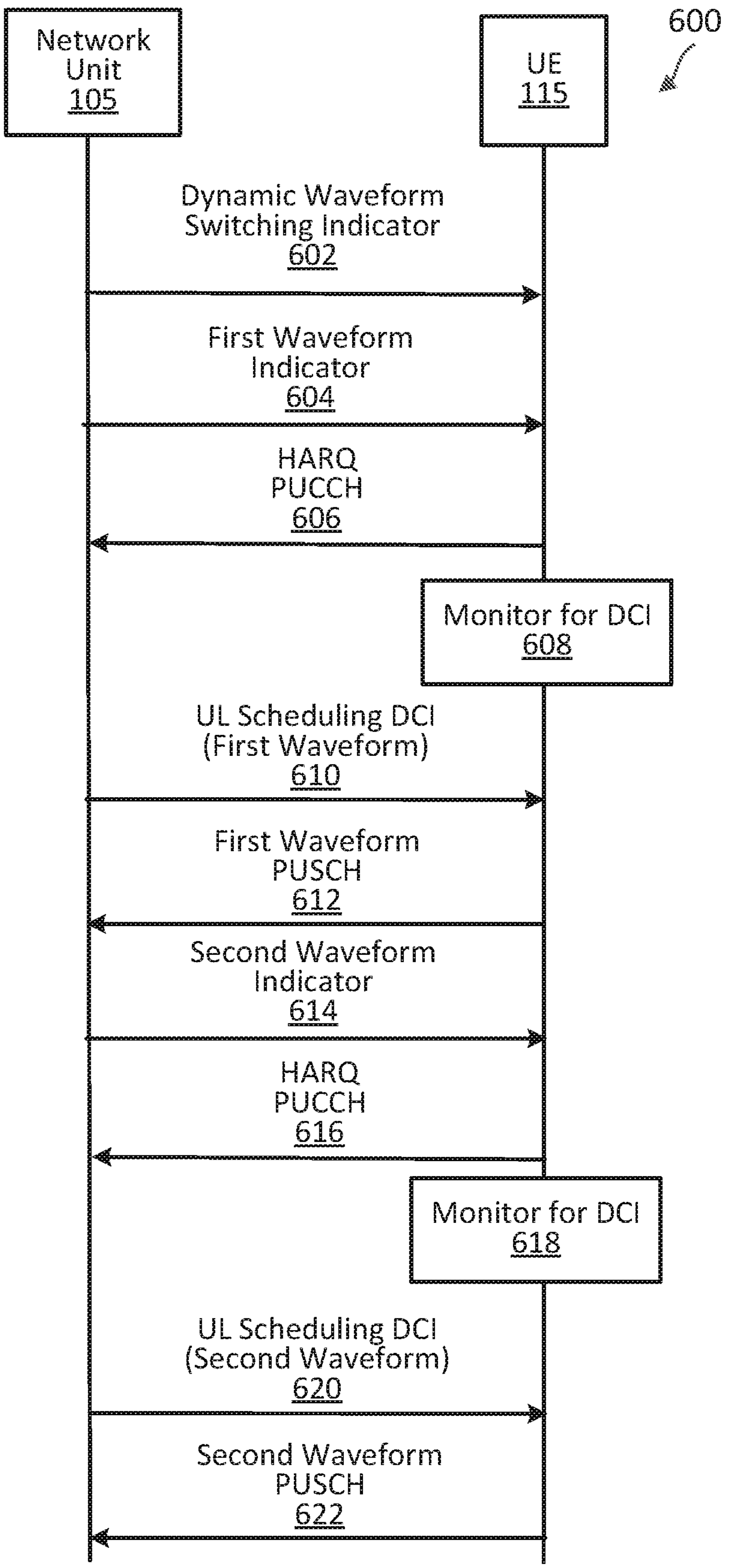
FIG. 6 is a signal flow diagram of a communication method according to some aspects of the present disclosure.

FIG. 6 is a flow diagram of a communication method 600 according to some aspects of the present disclosure. Aspects of the method 600 may be executed by a computing device (e.g., a processor, processing circuit, and/or other suitable component) of a wireless communication device or other suitable means for performing the actions. For example, a wireless communication device, such as the BS 105, the RU 240, the DU 230, the CU 210, and/or the network unit 800, may utilize one or more components, such as the processor 802, the memory 804, the waveform switching module 808, the transceiver 810, the modem 812, and the one or more antennas 816, to execute aspects of method 600. For example, a wireless communication device, such as the UE 115 or the UE 700 may utilize one or more components, such as the processor 702, the memory 704, the waveform switching module 708, the transceiver 710, the modem 712, and the one or more antennas 716, to execute aspects of method 600. The method 600 may employ similar mechanisms as in the networks 100 or 200 and the aspects and actions described with respect to FIGS. 3-4. As illustrated, the method 600 includes a number of enumerated actions, but the method 600 may include additional actions before, after, and in between the enumerated actions. In some aspects, one or more of the enumerated actions may be omitted or performed in a different order.

At action 602, the network unit 105 may transmit a dynamic waveform switching indicator to the UE 115 indicating dynamic waveform switching between a first waveform type and a second waveform type. In this regard, the UE 115 may receive the indicator via at least one of a radio resource control (RRC) message, a medium access control control element (MAC-CE) communication, or other suitable communication. For example, the RRC message, MAC-CE communication, or other suitable communication MAC-CE may include codepoint(s) indicating the enablement of dynamic waveform switching.

At action 604, the network unit 105 may transmit a first waveform indicator to the UE 115. The first waveform indicator may be transmitted via non-uplink scheduling DCI and/or a MAC-CE message.

At action 606, the UE may transmit a HARQ PUCCH to the network unit acknowledging receipt of the first waveform indicator received at action 604.

At action 608, the UE 115 may monitor for DCI. In some aspects, the UE 115 may monitor for the DCI by blind decoding a search space based on the size of the DCI associated with the first waveform type. In this way, the UE may reduce computing resources and/or power consumption by blind decoding only a single size of DCI as compared to blind decoding two different sized DCIs.

At action 610, the network unit 105 may transmit an uplink scheduling DCI to the UE 115 indicating scheduled resources for a PUSCH communication using the first waveform type.

At action 612, the UE may transmit a PUSCH communication to the network unit via the scheduled resources received at action 610 using the first waveform type indicated at action 604.

At action 614, the network unit 105 may transmit a second waveform indicator to the UE 115. The second waveform indicator may be transmitted via non-uplink scheduling DCI and/or a MAC-CE message.

At action 616, the UE may transmit a HARQ PUCCH to the network unit acknowledging receipt of the second waveform indicator received at action 614.

At action 618, the UE 115 may monitor for DCI. In some aspects, the UE 115 may monitor for the DCI by blind decoding a search space based on the size of the DCI associated with the second waveform type. In this way, the UE may reduce computing resources and/or power consumption by blind decoding only a single size of DCI as compared to blind decoding two different sized DCIs.

At action 620, the network unit 105 may transmit an uplink scheduling DCI to the UE 115 indicating scheduled resources for a PUSCH communication using the second waveform type.

At action 622, the UE may transmit a PUSCH communication to the network unit via the scheduled resources received at action 620 using the second waveform type indicated at action 614.

Figure 7:
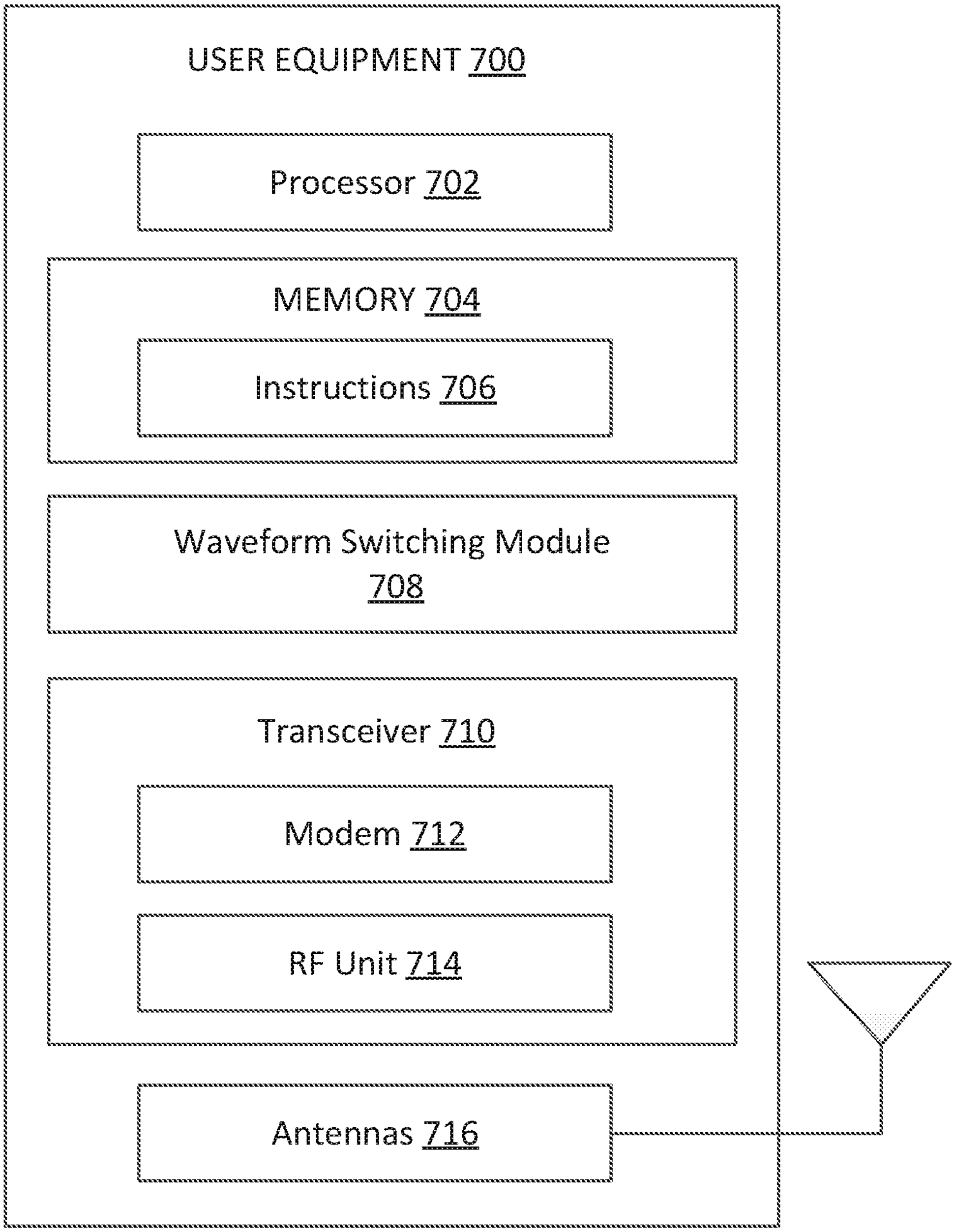
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 in the network 100, or 200 as discussed above. As shown, the UE 700 may include a processor 702, a memory 704, a waveform switching module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 3-6. Instructions 706 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The waveform switching module 708 may be implemented via hardware, software, or combinations thereof. For example, the waveform switching module 708 may be implemented as a processor, circuit, and/or instructions 706 stored in the memory 704 and executed by the processor 702. In some aspects, the waveform switching module 708 may implement the aspects of FIGS. 3-6. For example, the waveform switching module 708 may receiving, from a network unit (e.g., network unit 800, the BS 105, the CU 210, the DU 230, or the RU 240), an indicator indicating dynamic waveform switching between a first waveform type and a second waveform type and monitoring, based on the indicator, for downlink control information (DCI) from the network unit, wherein at least one of a size of the DCI, a size of a bitfield of the DCI, or a location of the bitfield of the DCI is interpreted based on the indicator.

As shown, the transceiver 710 may include the modem subsystem 712 and the RF unit 714. The transceiver 710 may be configured to communicate bi-directionally with other devices, such as the BS s 105 and/or the UEs 115. The modem subsystem 712 may be configured to modulate and/or encode the data from the memory 704 and the according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 may include multiple transceivers 710 implementing different RATs (e.g., NR and LTE). In some instances, the UE 700 may include a single transceiver 710 implementing multiple RATs (e.g., NR and LTE). In some instances, the transceiver 710 may include various components, where different combinations of components may implement RATs.

Figure 8:
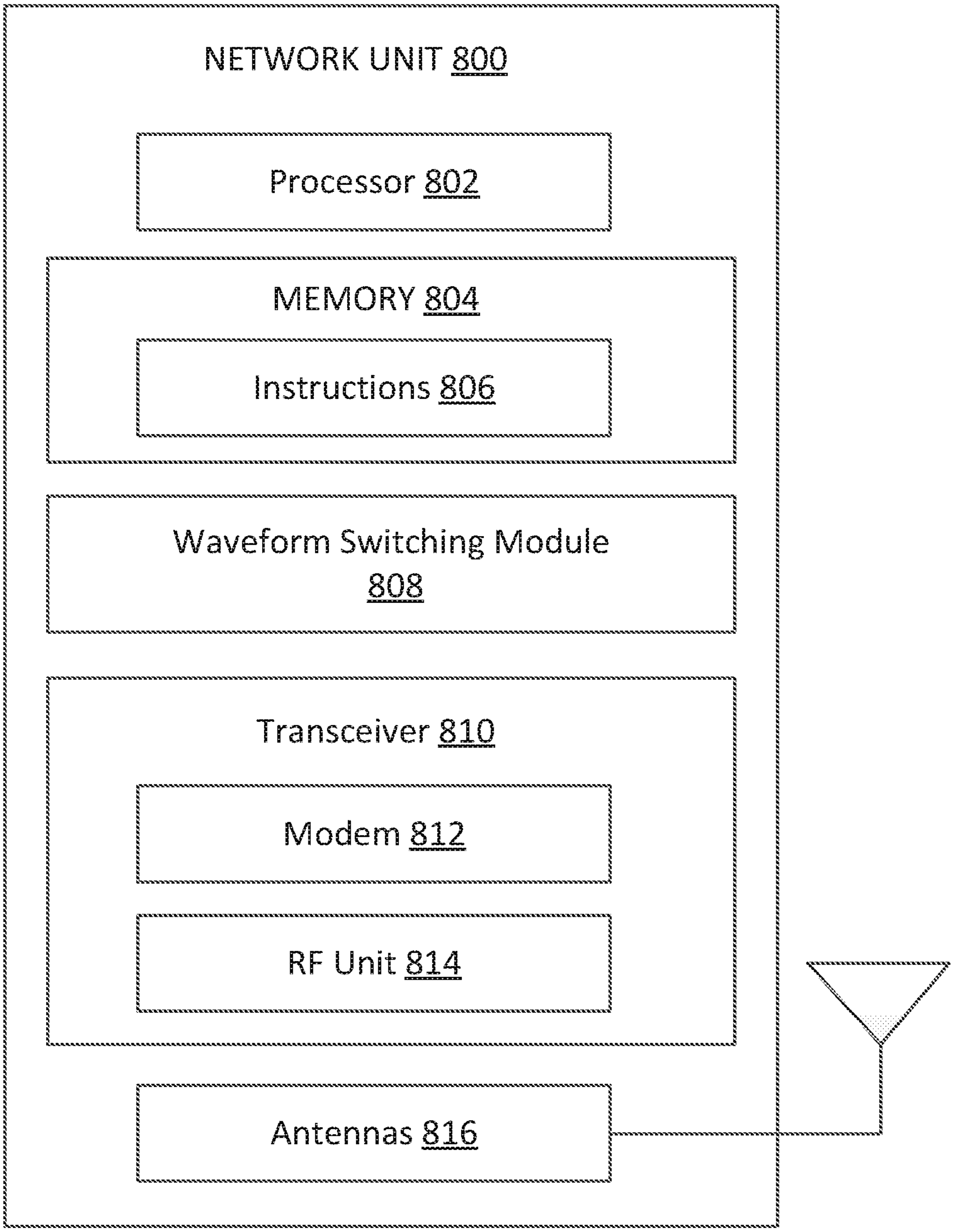
FIG. 8 is a block diagram of an exemplary network unit according to some aspects of the present disclosure.

FIG. 8 is a block diagram of an exemplary network unit 800 according to some aspects of the present disclosure. The network unit 800 may be the BS 105, the CU 210, the DU 230, or the RU 240, as discussed above. As shown, the network unit 800 may include a processor 802, a memory 804, a waveform switching module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 3-6. Instructions 806 may also be referred to as code, which may be interpreted broadly to include any type of computer-readable statement(s).

The waveform switching module 808 may be implemented via hardware, software, or combinations thereof. For example, the waveform switching module 808 may be implemented as a processor, circuit, and/or instructions 806 stored in the memory 804 and executed by the processor 802.

In some aspects, the waveform switching module 808 may implement the aspects of FIGS. 3-6. For example, the waveform switching module 808 may transmit, to a UE (e.g., the UE 115 or the UE 700), an indicator indicating dynamic waveform switching between a first waveform type and a second waveform type. The waveform switching module 808 may transmit, to the UE based on the indicator, downlink control information (DCI), wherein at least one of a size of the DCI, a size of a bitfield of the DCI, or a location of the bitfield of the DCI is interpreted based on the indicator.

Additionally or alternatively, the waveform switching module 808 may be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 may be configured to communicate bi-directionally with other devices, such as the UEs 115 and/or 800. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the network unit 800 to enable the network unit 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a configuration indicating a plurality of sub-slots within a slot according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the network unit 800 may include multiple transceivers 810 implementing different RATs (e.g., NR and LTE). In some instances, the network unit 800 may include a single transceiver 810 implementing multiple RATs (e.g., NR and LTE). In some instances, the transceiver 810 may include various components, where different combinations of components may implement RATs.

Figure 9:
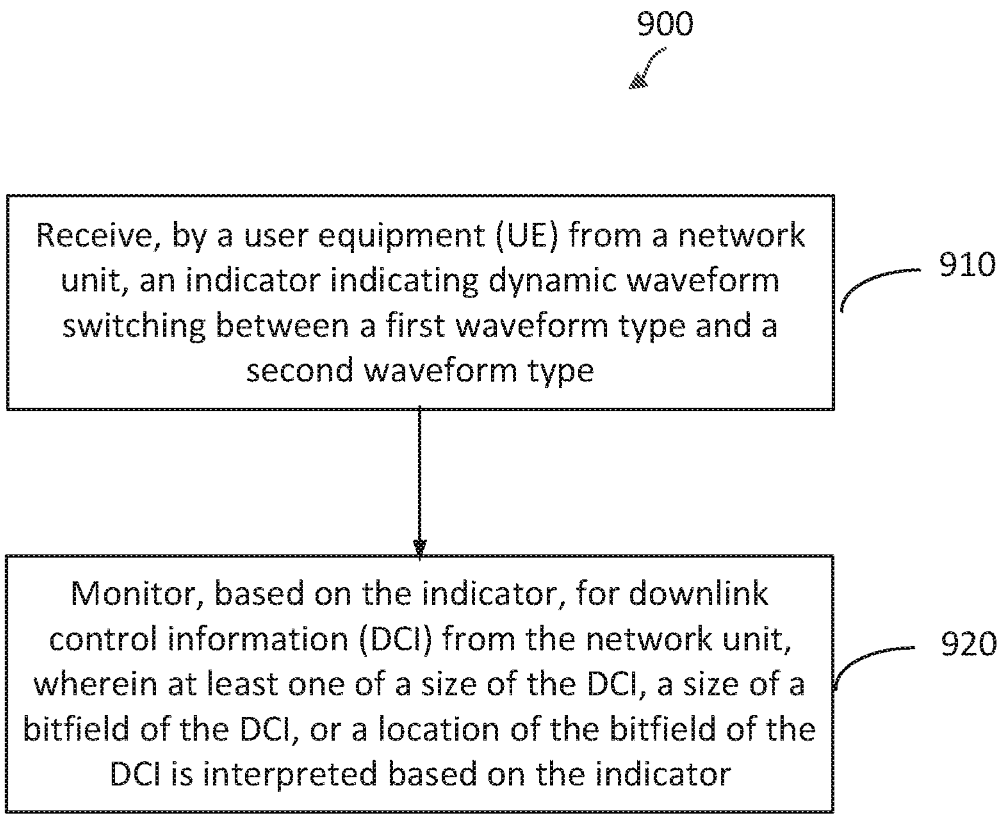
FIG. 9 is a flow diagram of a communication method according to some aspects of the present disclosure.

FIG. 9 is a flow diagram of a communication method 900 according to some aspects of the present disclosure. Aspects of the method 900 may be executed by a computing device (e.g., a processor, processing circuit, and/or other suitable component) of a wireless communication device or other suitable means for performing the actions. For example, a wireless communication device, such as the UE 115 or the UE 700, may utilize one or more components, such as the processor 702, the memory 704, the waveform switching module 708, the transceiver 710, the modem 712, and the one or more antennas 716, to execute aspects of method 900. The method 900 may employ similar mechanisms as in the networks 100 and 200 and the aspects and actions described with respect to FIGS. 3-6. As illustrated, the method 900 includes a number of enumerated actions, but the method 900 may include additional actions before, after, and in between the enumerated actions. In some aspects, one or more of the enumerated actions may be omitted or performed in a different order.

At action 910, the method 900 includes a UE (e.g., the UE 115 or the UE 700) receiving an indicator from a network unit (e.g., the network unit 800, the BS 105, the RU 240, the DU 230, and/or the CU 210) indicating dynamic waveform switching between a first waveform type and a second waveform type. In this regard, the UE may receive the indicator via at least one of a radio resource control (RRC) message, a medium access control control element (MAC-CE) communication, or other suitable communication. For example, the RRC message, MAC-CE communication, or other suitable communication MAC-CE may include codepoint(s) indicating the enablement of dynamic waveform switching.

In some aspects, the first waveform type may include a discrete Fourier transform spread orthogonal frequency division multiplexing (DFT-s-OFDM) waveform or other suitable waveform type. The second waveform type may include a cyclic-prefix OFDM (CP-OFDM) waveform or other suitable waveform type. The dynamic waveform switching may enable the UE to maximize network coverage and/or network capacity. For example, the UE may switch to transmitting uplink communications using a DFT-s-OFDM waveform to increase range and coverage. In some aspects, the UE may switch to transmitting uplink communications using a CP-OFDM waveform to increase throughput and/or data rate.

At action 920, the method 900 includes the UE monitoring for downlink control information (DCI) from the network unit. The UE may monitor for the DCI (e.g., a dynamic waveform switching DCI) based on the indicator received at action 910. In some aspects, the size of the DCI, a size of a bitfield of the DCI, or a location of the bitfield of the DCI may be interpreted based on the indicator. The DCI may be associated with the first waveform type or the second waveform type. In some aspects, the size of the DCI may be the same (e.g., a common size) when the DCI is associated with the first waveform type and when the DCI is associated with the second waveform type. However, the size of the bitfield of the DCI may be different when the DCI is associated with the first waveform type compared to when the DCI is associated with the second waveform type. Additionally or alternatively, the location of the bitfield of the DCI may be different when the DCI is associated with the first waveform type compared to when the DCI is associated with the second waveform type. The UE may interpret the size of the DCI, the size of the bitfield, and/or the location of the bitfield based on whether the DCI is associated with the first waveform type or the second waveform type.

In some aspects, the indicator may further indicate the size of the DCI. The size of the DCI may be a maximum size of a DCI associated with the first waveform type or a size of a DCI associated the second waveform type. For example, if the default (e.g., legacy) size of the DCI associated with the first waveform type is x and the default (e.g., legacy) size of the DCI associated with the second waveform type is x+y, the size of the dynamic waveform switching DCI may be x+y. Additionally or alternatively, if the default (e.g., legacy) size of the DCI associated with the second waveform type is x and the default (e.g., legacy) size of the DCI associated with the first waveform type is x+y, the size of the dynamic waveform switching DCI may be x+y.

In some aspects, the UE may monitor for the DCI by blind decoding a search space based on the size of the DCI. Since the size of the dynamic waveform switching DCI is the same for the first waveform type and the second waveform type, the UE may monitor for a single size (e.g., a common size) DCI. The UE may reduce computing resources and/or power consumption by blind decoding a DCI having a common size for the first and second waveform types as compared to blind decoding a first DCI associated with the first waveform type and blind decoding a second, different sized DCI associated with the second waveform type.

In some aspects, the bitfield of the DCI may include at least one zero padding bit. For example, when the size of the dynamic waveform switching DCI is x+y based on the default (e.g., legacy) size of the DCI associated with the first waveform type being x and the default (e.g., legacy) size of the DCI associated with the second waveform type being x+y. The dynamic waveform switching DCI may include y zero padding bits when the dynamic waveform switching DCI is associated with the first waveform type.

In some aspects, the dynamic waveform switching DCI may repurpose bitfield(s) of a default (e.g. legacy) DCI. For example, the bitfield of the DCI may include a row/column of a time domain resource allocation (TDRA) table, a row/column of a frequency domain resource allocation (FDRA) table, a row/column of a modulation and coding scheme (MCS) table, or other suitable repurposed bitfield.

In some aspects, the size of the DCI may be based on a format of the DCI (e.g., DCI format 0_0, 0_1, 1_0, 1_1, 2_0, 2_1, 2_2, or 2_3). For example, a first DCI format may indicate a first DCI size while a second DCI format may indicate a second, different DCI size. In some aspects, the size of the bitfield of the DCI may be based on the format of the DCI. In some aspects, the location of the bitfield of the DCI may be based on the format of the DCI.

In some aspects, the UE may receive the DCI from the network unit based on blind decoding the DCI. The DCI may indicate scheduled resources (e.g., time resources and/or frequency resources) for a physical uplink shared channel (PUSCH) communication associated with the UE. The DCI may indicate whether the PUSCH should be transmitted using the first waveform type or the second waveform type. For example, the scheduling information may explicitly indicate and/or implicitly indicate the PUSCH communication should be transmitted using the first waveform type or the second waveform type. The scheduling information that implicitly indicates the PUSCH communication should be transmitted using the first waveform type or the second waveform type may include a resource allocation (RA) type, the most significant bit of the RA, the number of resource blocks in the scheduled resources, the location (e.g., frequency subchannels, slot indexes) of the resource blocks, an MCS associated with the scheduled resources, the number of PUSCH communication repetitions, the number of demodulation reference signals (DMRS) code division multiplexed (CDM) groups without data, precoding information, the number of layers, sounding reference signal resource indicator (SRI), and/or other suitable scheduling information.

In some aspects, the UE may transmit the PUSCH communication to the network unit using the indicated waveform type via the scheduled resources.

Figure 10:
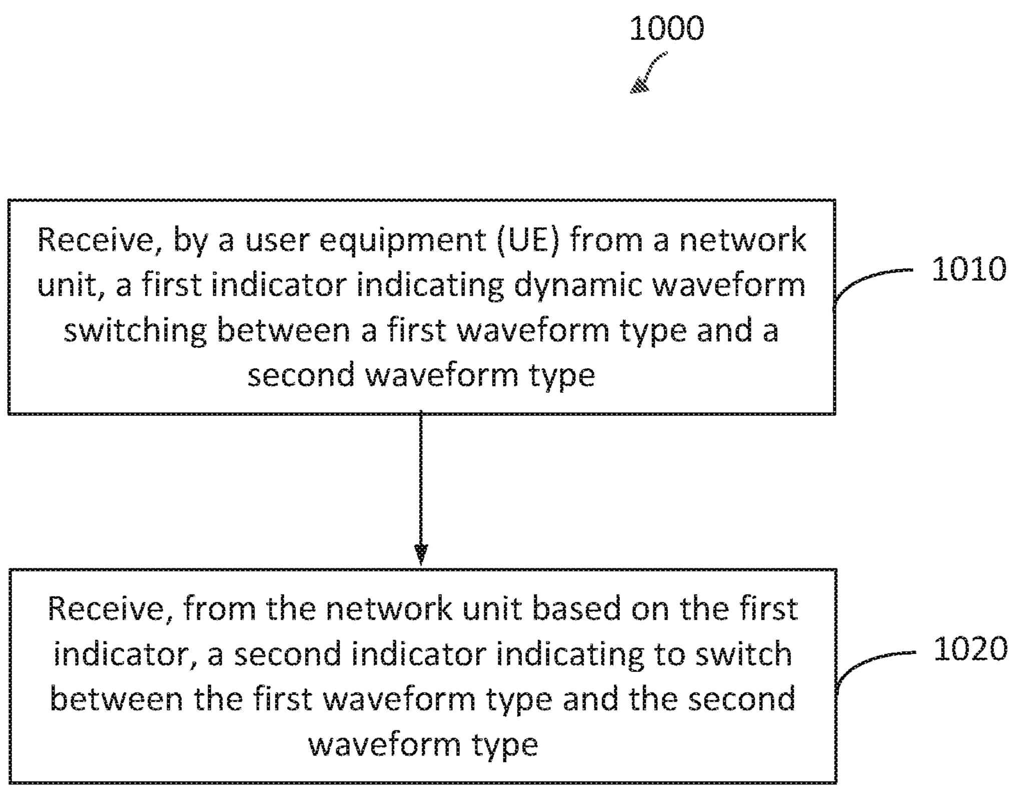
FIG. 10 is a flow diagram of a communication method according to some aspects of the present disclosure.

FIG. 10 is a flow diagram of a communication method 1000 according to some aspects of the present disclosure. Aspects of the method 1000 may be executed by a computing device (e.g., a processor, processing circuit, and/or other suitable component) of a wireless communication device or other suitable means for performing the actions. For example, a wireless communication device, such as the UE 115 or the UE 700, may utilize one or more components, such as the processor 702, the memory 704, the waveform switching module 708, the transceiver 710, the modem 712, and the one or more antennas 716, to execute aspects of method 1000. The method 1000 may employ similar mechanisms as in the networks 100 and 200 and the aspects and actions described with respect to FIGS. 3-6. As illustrated, the method 1000 includes a number of enumerated actions, but the method 1000 may include additional actions before, after, and in between the enumerated actions. In some aspects, one or more of the enumerated actions may be omitted or performed in a different order.

At action 1010, the method 1000 includes a UE (e.g., the UE 115 or the UE 700) receiving an indicator from a network unit (e.g., the network unit 800, the BS 105, the RU 240, the DU 230, and/or the CU 210) indicating dynamic waveform switching between a first waveform type and a second waveform type. In this regard, the UE may receive the indicator via at least one of a radio resource control (RRC) message, a medium access control control element (MAC-CE) communication, or other suitable communication. For example, the RRC message, MAC-CE communication, or other suitable communication MAC-CE may include codepoint(s) indicating the dynamic waveform switching.

At action 1020, the method 1000 includes the UE receiving a second indicator from the network unit indicating to switch between the first waveform type and the second waveform type. The first indicator may enable the UE waveform type switching while the second indicator may indicate which waveform type to switch to for uplink communications.

In some aspects, the second indicator may include non-uplink communication scheduling downlink control information (DCI). Non-uplink communication scheduling DCI may be DCI that includes an indicator of which waveform type to switch to but does not include scheduling resources for uplink communications. Additionally or alternatively, the second indicator may be included in a MAC-CE communication.

In some aspects, the UE may receive the second indicator on a semi-persistent (e.g., semi-static) basis. For example, the waveform type indicated by the second indicator may be valid until the waveform type is switched based on the UE receiving a subsequent second indicator. The subsequent second indicator may be a non-uplink scheduling DCI and/or a MAC-CE communication indicating the UE should switch to the other type of waveform (e.g., from the first waveform type to the second waveform type or switch from the second waveform type to the first waveform type).

The waveform type indicated by the second indicator may be valid for a period of time until a subsequent second indicator switches the waveform type. The time period may include one or more slots, sub-frames, frames, or other time period (e.g., a number of milliseconds). In some aspects, the waveform type may be switched based on UE conditions. For example, the waveform type may be switched to CP-OFDM waveform when the UE is scheduled to transmit uplink communications requiring a high data rate. In some aspects, the waveform type may be switched to DFT-s-OFDM waveform when the UE is located at a cell edge.

The UE may switch to the waveform type indicated by the second indicator after transmitting a HARQ-ACK communication to the network unit indicating successful receipt (e.g., decoding) of the second indicator. For example, the UE may switch to the waveform type indicated by the second indicator after a preconfigured (e.g., predefined) time period after transmitting the HARQ-ACK communication.

In some aspects, the UE may receive DCI from the network unit indicating scheduled resources for a PUSCH communication associated with the UE. The UE may transmit one or more PUSCH communications to the network unit via the scheduled resources using the first waveform type or the second waveform type based on the waveform type indicated by the second indicator.

In some aspects, the DCI indicating the scheduled resources for the PUSCH communication may include a DCI size associated with the first waveform type (e.g., a legacy first waveform DCI size) or a DCI size associated with the second waveform type (e.g., a legacy second waveform DCI size). The DCI size associated with the second waveform type may be different from the DCI size associated with the first waveform type. When the second indicator indicates the first waveform type, the UE may monitor for the DCI by blind decoding a search space based on the size of the DCI associated with the first waveform type. When the second indicator indicates the second waveform type, the UE may monitor for the DCI by blind decoding a search space based on the size of the DCI associated with the second waveform type. In this way the UE may reduce computing resources and/or power consumption by blind decoding only a single size of DCI as compared to blind decoding two different sized DCIs.

In some aspects, the DCI indicating the scheduled resources for the PUSCH communication may include a size of a bitfield of the DCI associated with the first waveform type (e.g., a legacy bitfield size of the first waveform type) or a size of a bitfield of the DCI associated with the second waveform type (e.g., a legacy bitfield size of the second waveform type). The size of the bitfield of the DCI associated with the second waveform type may be different from the size of the bitfield of the DCI associated with the first waveform type. When the second indicator indicates the first waveform type, the UE may interpret the bitfield based on the size of the bitfield of the DCI associated with the first waveform type. When the second indicator indicates the second waveform type, the UE may interpret the bitfield based on the size of the bitfield of the DCI associated with the second waveform type.

In some aspects, the DCI indicating the scheduled resources for the PUSCH communication may include a location of a bitfield of the DCI associated with the first waveform type (e.g., legacy bitfield location of the first waveform type) or a location of a bitfield of the DCI associated with the second waveform type (e.g., legacy bitfield location of the second waveform type). The location of the bitfield of the DCI associated with the second waveform type may be different from the location of the bitfield of the DCI associated with the first waveform type. When the second indicator indicates the first waveform type, the UE may interpret the location of the bitfield based on the location of the bitfield of the DCI associated with the first waveform type. When the second indicator indicates the second waveform type, the UE may interpret the location of the bitfield based on the location of the bitfield of the DCI associated with the second waveform type.

In some aspects, the UE may transmit the PUSCH communication(s) using the indicated waveform type via the scheduled resources. The UE may transmit the PUSCH communication(s) using the indicated waveform type until the UE receives a subsequent second indicator indicating to switch the waveform type.

Figure 11:
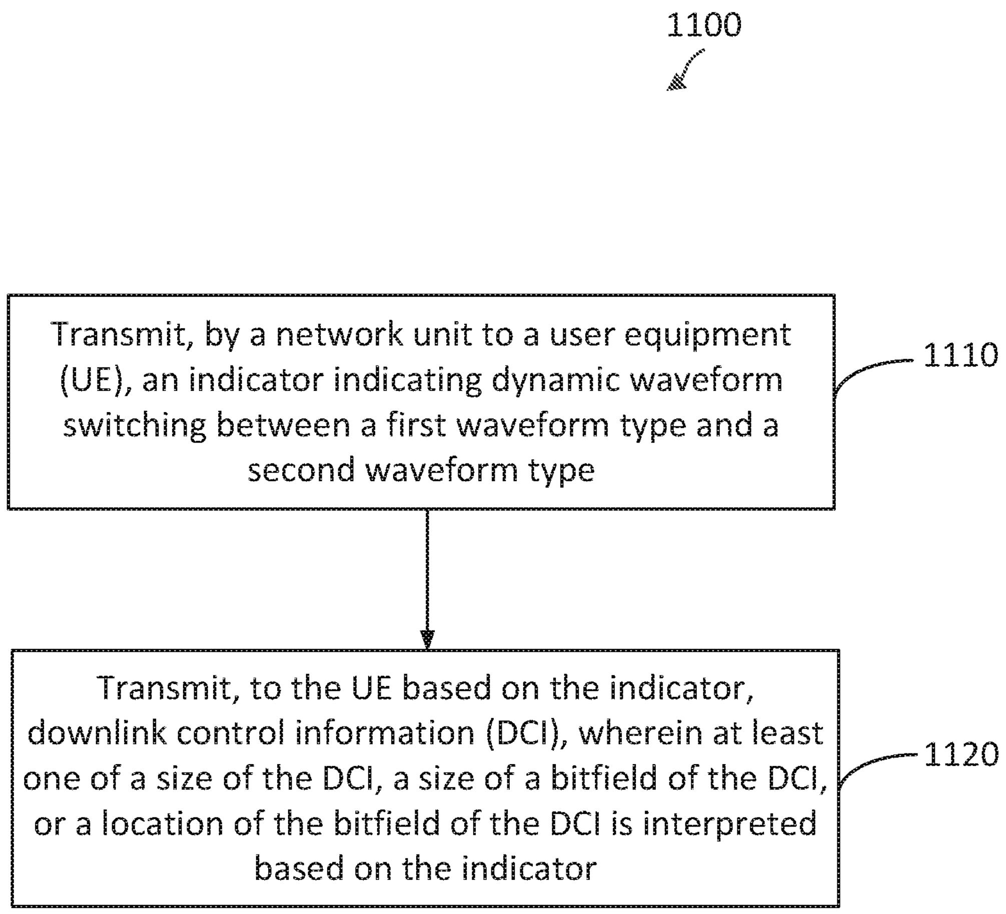
FIG. 11 is a flow diagram of a communication method according to some aspects of the present disclosure.

FIG. 11 is a flow diagram of a communication method 1100 according to some aspects of the present disclosure. Aspects of the method 1100 may be executed by a computing device (e.g., a processor, processing circuit, and/or other suitable component) of a wireless communication device or other suitable means for performing the actions. For example, a wireless communication device, such as a network unit (e.g., the network unit 800, the BS 105, the RU 240, the DU 230, and/or the CU 210), may utilize one or more components, such as the processor 802, the memory 804, the waveform switching module 808, the transceiver 810, the modem 812, and the one or more antennas 816, to execute aspects of method 1100. The method 1100 may employ similar mechanisms as in the networks 100 and 200 and the aspects and actions described with respect to FIGS. 3-6. As illustrated, the method 1100 includes a number of enumerated actions, but the method 1100 may include additional actions before, after, and in between the enumerated actions. In some aspects, one or more of the enumerated actions may be omitted or performed in a different order.

At action 1110, the method 1100 includes a network unit (e.g., the network unit 800, the BS 105, the RU 240, the DU 230, and/or the CU 210) transmitting an indicator to a UE (e.g., the UE 115 or the UE 700) indicating dynamic waveform switching between a first waveform type and a second waveform type. In this regard, the network unit may transmit the indicator via at least one of a radio resource control (RRC) message, a medium access control control element (MAC-CE) communication, or other suitable communication. For example, the RRC message, MAC-CE communication, or other suitable communication MAC-CE may include codepoint(s) indicating the enablement of dynamic waveform switching.

In some aspects, the first waveform type may include a discrete Fourier transform spread orthogonal frequency division multiplexing (DFT-s-OFDM) waveform or other suitable waveform type. The second waveform type may include a cyclic-prefix OFDM (CP-OFDM) waveform or other suitable waveform type. The dynamic waveform switching may enable the UE to maximize network coverage and/or network capacity. For example, the UE may switch to transmitting uplink communications using a DFT-s-OFDM waveform to increase range and coverage. In some aspects, the UE may switch to transmitting uplink communications using a CP-OFDM waveform to increase throughput and/or data rate.

At action 1120, the method 1100 includes the network unit transmitting downlink control information (DCI) to the UE. The UE may monitor for the DCI (e.g., a dynamic waveform switching DCI) based on the indicator received at action 1110. In some aspects, the size of the DCI, a size of a bitfield of the DCI, or a location of the bitfield of the DCI may be interpreted based on the indicator. The DCI may be associated with the first waveform type or the second waveform type. In some aspects, the size of the DCI may be the same (e.g., a common size) when the DCI is associated with the first waveform type and when the DCI is associated with the second waveform type. However, the size of the bitfield of the DCI may be different when the DCI is associated with the first waveform type compared to when the DCI is associated with the second waveform type. Additionally or alternatively, the location of the bitfield of the DCI may be different when the DCI is associated with the first waveform type compared to when the DCI is associated with the second waveform type. The UE may interpret the size of the DCI, the size of the bitfield, and/or the location of the bitfield based on whether the DCI is associated with the first waveform type or the second waveform type.

In some aspects, the indicator may further indicate the size of the DCI. The size of the DCI may be a maximum size of a DCI associated with the first waveform type or a size of a DCI associated the second waveform type. For example, if the default (e.g., legacy) size of the DCI associated with the first waveform type is x and the default (e.g., legacy) size of the DCI associated with the second waveform type is x+y, the size of the dynamic waveform switching DCI may be x+y. Additionally or alternatively, if the default (e.g., legacy) size of the DCI associated with the second waveform type is x and the default (e.g., legacy) size of the DCI associated with the first waveform type is x+y, the size of the dynamic waveform switching DCI may be x+y.

In some aspects, the UE may monitor for the DCI by blind decoding a search space based on the size of the DCI. Since the size of the dynamic waveform switching DCI is the same for the first waveform type and the second waveform type, the UE may monitor for a single size (e.g., a common size) DCI. The UE may reduce computing resources and/or power consumption by blind decoding a DCI having a common size for the first and second waveform types as compared to blind decoding a first DCI associated with the first waveform type and blind decoding a second, different sized DCI associated with the second waveform type.

In some aspects, the bitfield of the DCI may include at least one zero padding bit. For example, when the size of the dynamic waveform switching DCI is x+y based on the default (e.g., legacy) size of the DCI associated with the first waveform type being x and the default (e.g., legacy) size of the DCI associated with the second waveform type being x+y. The dynamic waveform switching DCI may include y zero padding bits when the dynamic waveform switching DCI is associated with the first waveform type.

In some aspects, the dynamic waveform switching DCI may repurpose bitfield(s) of a default (e.g. legacy) DCI. For example, the bitfield of the DCI may include a row/column of a time domain resource allocation (TDRA) table, a row/column of a frequency domain resource allocation (FDRA) table, a row/column of a modulation and coding scheme (MCS) table, or other suitable repurposed bitfield.

In some aspects, the size of the DCI may be based on a format of the DCI (e.g., DCI format 0_0, 0_1, 1_0, 1_1, 2_0, 2_1, 2_2, or 2_3). For example, a first DCI format may indicate a first DCI size while a second DCI format may indicate a second, different DCI size. In some aspects, the size of the bitfield of the DCI may be based on the format of the DCI. In some aspects, the location of the bitfield of the DCI may be based on the format of the DCI.

In some aspects, the UE may receive the DCI from the network unit based on blind decoding the DCI. The DCI may indicate scheduled resources (e.g., time resources and/or frequency resources) for a physical uplink shared channel (PUSCH) communication associated with the UE. The DCI may indicate whether the PUSCH should be received by the network unit using the first waveform type or the second waveform type. For example, the scheduling information may explicitly indicate and/or implicitly indicate the PUSCH communication should be received by the network unit using the first waveform type or the second waveform type. The scheduling information that implicitly indicates the PUSCH communication should be received by the network unit using the first waveform type or the second waveform type may include a resource allocation (RA) type, the most significant bit of the RA, the number of resource blocks in the scheduled resources, the location (e.g., frequency subchannels, slot indexes) of the resource blocks, an MCS associated with the scheduled resources, the number of PUSCH communication repetitions, the number of demodulation reference signals (DMRS) code division multiplexed (CDM) groups without data, precoding information, the number of layers, sounding reference signal resource indicator (SRI), and/or other suitable scheduling information.

In some aspects, the network unit may receive the PUSCH communication from the UE using the indicated waveform type via the scheduled resources.

Figure 12:
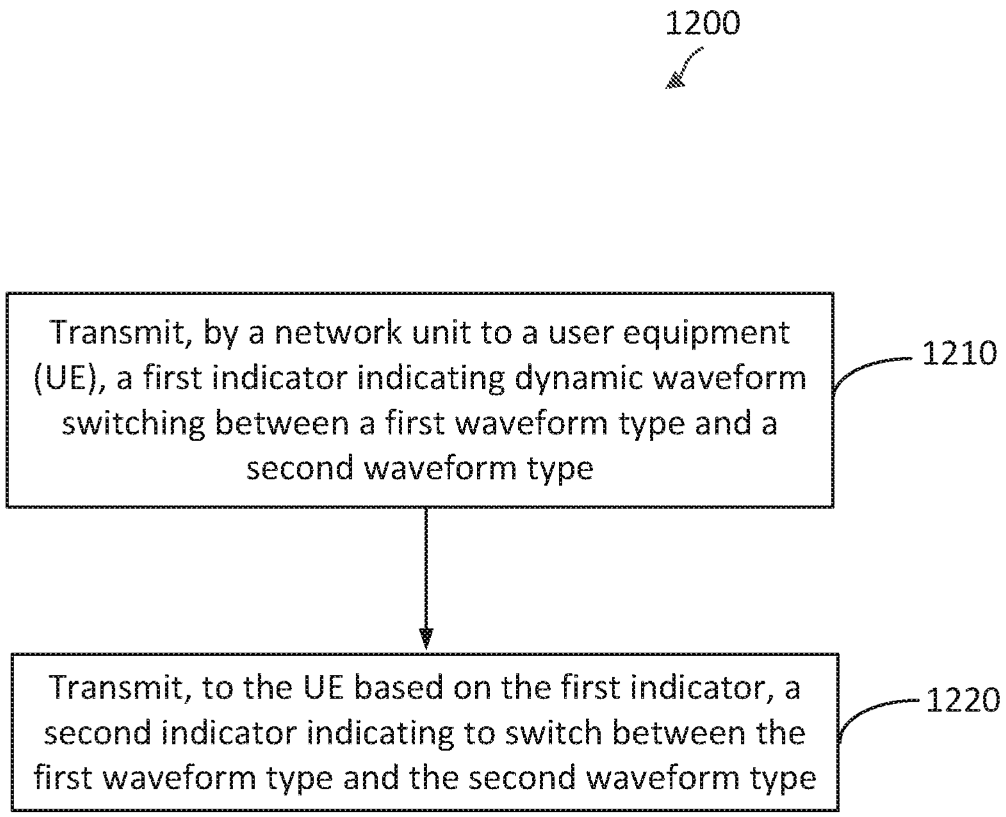
FIG. 12 is a flow diagram of a communication method according to some aspects of the present disclosure.

FIG. 12 is a flow diagram of a communication method 1200 according to some aspects of the present disclosure. Aspects of the method 1200 may be executed by a computing device (e.g., a processor, processing circuit, and/or other suitable component) of a wireless communication device or other suitable means for performing the actions. For example, a wireless communication device, such as a network unit (e.g., the network unit 800, the BS 105, the RU 240, the DU 230, and/or the CU 210), may utilize one or more components, such as the processor 802, the memory 804, the waveform switching module 808, the transceiver 810, the modem 812, and the one or more antennas 816, to execute aspects of method 1200. The method 1200 may employ similar mechanisms as in the networks 100 and 200 and the aspects and actions described with respect to FIGS. 3-6. As illustrated, the method 1200 includes a number of enumerated actions, but the method 1200 may include additional actions before, after, and in between the enumerated actions. In some aspects, one or more of the enumerated actions may be omitted or performed in a different order.

At action 1210, the method 1200 includes a network unit (e.g., the network unit 800, the BS 105, the RU 240, the DU 230, and/or the CU 210) transmitting a first indicator to a UE (e.g., the UE 115 or the UE 700) indicating dynamic waveform switching between a first waveform type and a second waveform type. In this regard, the network unit may transmit the indicator via at least one of a radio resource control (RRC) message, a medium access control control element (MAC-CE) communication, or other suitable communication. For example, the RRC message, MAC-CE communication, or other suitable communication MAC-CE may include codepoint(s) indicating the dynamic waveform switching.

At action 1220, the method 1200 includes the network unit transmitting, based on the first indicator, a second indicator to the UE indicating to switch between the first waveform type and the second waveform type. The first indicator may enable the UE waveform type switching while the second indicator may indicate which waveform type to switch to for uplink communications.

In some aspects, the second indicator may include non-uplink communication scheduling downlink control information (DCI). Non-uplink communication scheduling DCI may be DCI that includes an indicator of which waveform type to switch to but does not include scheduling resources for uplink communications. Additionally or alternatively, the second indicator may be included in a MAC-CE communication.

In some aspects, the network unit may transmit the second indicator on a semi-persistent (e.g., semi-static) basis. For example, the waveform type indicated by the second indicator may be valid until the waveform type is switched based on the network unit transmitting a subsequent second indicator. The subsequent second indicator may be a non-uplink scheduling DCI and/or a MAC-CE communication indicating the UE should switch to the other type of waveform (e.g., from the first waveform type to the second waveform type or switch from the second waveform type to the first waveform type).

The waveform type indicated by the second indicator may be valid for a period of time until a subsequent second indicator switches the waveform type. The time period may include one or more slots, sub-frames, frames, or other time period (e.g., a number of milliseconds). In some aspects, the waveform type may be switched based on UE conditions. For example, the waveform type may be switched to CP-OFDM waveform when the UE is scheduled to transmit uplink communications requiring a high data rate. In some aspects, the waveform type may be switched to DFT-s-OFDM waveform when the UE is located at a cell edge.

The UE may switch to the waveform type indicated by the second indicator after transmitting a HARQ-ACK communication to the network unit indicating successful receipt (e.g., decoding) of the second indicator. For example, the UE may switch to the waveform type indicated by the second indicator after a preconfigured (e.g., predefined) time period after transmitting the HARQ-ACK communication.

In some aspects, the network unit may transmit DCI to the UE indicating scheduled resources for a PUSCH communication associated with the UE. The network unit may receive one or more PUSCH communications from the UE via the scheduled resources using the first waveform type or the second waveform type based on the waveform type indicated by the second indicator.

In some aspects, the DCI indicating the scheduled resources for the PUSCH communication may include a DCI size associated with the first waveform type (e.g., a legacy first waveform DCI size) or a DCI size associated with the second waveform type (e.g., a legacy second waveform DCI size). The DCI size associated with the second waveform type may be different from the DCI size associated with the first waveform type. When the second indicator indicates the first waveform type, the UE may monitor for the DCI by blind decoding a search space based on the size of the DCI associated with the first waveform type. When the second indicator indicates the second waveform type, the UE may monitor for the DCI by blind decoding a search space based on the size of the DCI associated with the second waveform type. In this way the UE may reduce computing resources and/or power consumption by blind decoding only a single size of DCI as compared to blind decoding two different sized DCIs.

In some aspects, the DCI indicating the scheduled resources for the PUSCH communication may include a size of a bitfield of the DCI associated with the first waveform type (e.g., a legacy bitfield size of the first waveform type) or a size of a bitfield of the DCI associated with the second waveform type (e.g., a legacy bitfield size of the second waveform type). The size of the bitfield of the DCI associated with the second waveform type may be different from the size of the bitfield of the DCI associated with the first waveform type. When the second indicator indicates the first waveform type, the UE may interpret the bitfield based on the size of the bitfield of the DCI associated with the first waveform type. When the second indicator indicates the second waveform type, the UE may interpret the bitfield based on the size of the bitfield of the DCI associated with the second waveform type.

In some aspects, the DCI indicating the scheduled resources for the PUSCH communication may include a location of a bitfield of the DCI associated with the first waveform type (e.g., legacy bitfield location of the first waveform type) or a location of a bitfield of the DCI associated with the second waveform type (e.g., legacy bitfield location of the second waveform type). The location of the bitfield of the DCI associated with the second waveform type may be different from the location of the bitfield of the DCI associated with the first waveform type. When the second indicator indicates the first waveform type, the UE may interpret the location of the bitfield based on the location of the bitfield of the DCI associated with the first waveform type. When the second indicator indicates the second waveform type, the UE may interpret the location of the bitfield based on the location of the bitfield of the DCI associated with the second waveform type.

In some aspects, the network unit may receive the PUSCH communication(s) using the indicated waveform type via the scheduled resources. The network unit may receive the PUSCH communication(s) using the indicated waveform type until the network unit transmits a subsequent second indicator indicating to switch the waveform type.

Further aspects of the present disclosure include the following:

Aspect 1 includes a method of wireless communication performed by a user equipment (UE), the method comprising receiving, from a network unit, an indicator indicating dynamic waveform switching between a first waveform type and a second waveform type; and monitoring, based on the indicator, for downlink control information (DCI) from the network unit, wherein at least one of a size of the DCI, a size of a bitfield of the DCI, or a location of the bitfield of the DCI is interpreted based on the indicator.

Aspect 2 includes the method of aspect 1, wherein the first waveform type includes a discrete Fourier transform spread orthogonal frequency division multiplexing (DFT-s-OFDM) waveform; and the second waveform type includes a cyclic-prefix OFDM (CP-OFDM) waveform.

Aspect 3 includes the method of any of aspects 1-2, wherein the receiving the indicator includes receiving the indicator via at least one of a radio resource control (RRC) communication; or a medium access control control element (MAC-CE) communication.

Aspect 4 includes the method of any of aspects 1-3, wherein the DCI is associated with the first waveform type or the second waveform type; and the size of the DCI associated with the first waveform type is a same size as the size of the DCI associated with the second waveform type.

Aspect 5 includes the method of any of aspects 1-4, wherein the indicator further indicates the size of the DCI, the size of the DCI being a maximum size of a DCI associated with the first waveform type or a size of a DCI associated the second waveform type; and the monitoring for the DCI includes monitoring for the DCI by blind decoding a search space based on the size of the DCI.

Aspect 6 includes the method of any of aspects 1-5, wherein the bitfield of the DCI includes at least one zero padding bit.

Aspect 7 includes the method of any of aspects 1-6, further comprising receiving, from the network unit based on the monitoring, the DCI, wherein the DCI indicates scheduled resources for a physical uplink shared channel (PUSCH) communication associated with the UE; and at least one of the first waveform type is associated with the PUSCH communication; or the second waveform type is associated with the PUSCH communication.

Aspect 8 includes the method of any of aspects 1-7, further comprising transmitting, to the network unit, the PUSCH communication using the indicated waveform type and the scheduled resources.

Aspect 9 includes the method of any of aspects 1-8, further comprising receiving, from the network unit based on the monitoring, the DCI, wherein the DCI indicates scheduling information associated with a physical uplink shared channel (PUSCH) communication associated with the UE; and the scheduling information implicitly indicates at least one of the first waveform type is associated with the PUSCH communication; or the second waveform type is associated with the PUSCH communication.

Aspect 10 includes the method of any of aspects 1-9, further comprising receiving, from the network unit based on the monitoring, the DCI, wherein the bitfield of the DCI includes a column of a time domain resource allocation (TDRA) table.

Aspect 11 includes the method of any of aspects 1-10, further comprising receiving, from the network unit based on the monitoring, the DCI, wherein the bitfield of the DCI includes a column of a time domain resource allocation (TDRA) table.

Aspect 12 includes the method of any of aspects 1-11, wherein at least one of the size of the DCI is based on a format of the DCI; the size of the bitfield of the DCI is based on the format of the DCI; or the location of the bitfield of the DCI is based on the format of the DCI.

Aspect 13 includes the method of any of aspects 1-12, wherein the monitoring for the DCI includes monitoring for the DCI by maintaining a same number of blind decodes per search space for a DCI associated with the first waveform and a DCI associated with the second waveform.

Aspect 14 includes a method of wireless communication performed by a user equipment (UE) the method comprising receiving, from a network unit, a first indicator indicating dynamic waveform switching between a first waveform type and a second waveform type; and receiving, from the network unit based on the first indicator, a second indicator indicating to switch between the first waveform type and the second waveform type.

Aspect 15 includes the method of aspect 14, wherein the second indicator is non-uplink communication scheduling downlink control information (DCI).

Aspect 16 includes the method of any of aspects 14-15, wherein the second indicator is a medium access control control element (MAC-CE) communication.

Aspect 17 includes the method of any of aspects 14-16, wherein the receiving the second indicator includes receiving the second indicator on a semi-persistent basis.

Aspect 18 includes the method of any of aspects 14-17, further comprising receiving, from the network unit, downlink control information (DCI) indicating scheduled resources for a physical uplink shared channel (PUSCH) communication associated with the UE; and transmitting, to the network unit based on the second indicator, the PUSCH communication using the first waveform type or the second waveform type.

Aspect 19 includes the method of any of aspects 14-18, wherein a size of the DCI is a first size of a DCI associated with the first waveform type; a size of a bitfield of the DCI is a first size of a bitfield of the DCI associated with the first waveform type; and a location of the bitfield of the DCI is a first location of the bitfield of the DCI associated with the first waveform type.

Aspect 20 includes the method of any of aspects 14-19, further comprising monitoring for the DCI by blind decoding a search space based on the first size of the DCI associated with the first waveform type.

Aspect 21 includes the method of any of aspects 14-20, wherein a size of the DCI is a second size of a DCI associated with the second waveform type; a size of a bitfield of the DCI is a second bitfield size of the DCI associated with the second waveform type; and a location of the bitfield of the DCI is a second location of the bitfield of the DCI associated with the second waveform type.

Aspect 22 includes the method of any of aspects 14-21, further comprising monitoring for the DCI by blind decoding a search space based on the second size of the DCI associated with the second waveform type.

Aspect 23 includes the method of any of aspects 14-22, wherein the first waveform type includes a discrete Fourier transform spread orthogonal frequency division multiplexing (DFT-s-OFDM) waveform; and the second waveform type includes a cyclic-prefix OFDM (CP-OFDM) waveform.

Aspect 24 includes the method of any of aspects 14-23, wherein the receiving the first indicator includes receiving the first indicator via at least one of a radio resource control (RRC) communication; or a medium access control control element (MAC-CE) communication.

Aspect 25 includes a method of wireless communication performed by a network unit the method comprising transmitting, to a user equipment (UE), an indicator indicating dynamic waveform switching between a first waveform type and a second waveform type; and transmitting, to the UE based on the indicator, downlink control information (DCI), wherein at least one of a size of the DCI, a size of a bitfield of the DCI, or a location of the bitfield of the DCI is interpreted based on the indicator.

Aspect 26 includes the method of 25, wherein the first waveform type includes a discrete Fourier transform spread orthogonal frequency division multiplexing (DFT-s-OFDM) waveform; and the second waveform type includes a cyclic-prefix OFDM (CP-OFDM) waveform.

Aspect 27 includes the method of any of aspects 25-26, wherein the transmitting the indicator includes transmitting the indicator via at least one of radio resource control (RRC) communication; or a medium access control control element (MAC-CE) communication.

Aspect 28 includes the method of any of aspects 25-27, wherein the DCI is associated with the first waveform type or the second waveform type; and the size of the DCI associated with the first waveform type is a same size as the size of the DCI associated with the second waveform type.

Aspect 29 includes the method of any of aspects 25-28, wherein the indicator further indicates the size of the DCI, the size of the DCI being a maximum size of a DCI associated with the first waveform type or a size of a DCI associated the second waveform type.

Aspect 30 includes the method of any of aspects 25-29, wherein the bitfield of the DCI includes at least one zero padding bit.

Aspect 31 includes the method of any of aspects 25-30, wherein the DCI indicates scheduled resources for a physical uplink shared channel (PUSCH) communication associated with the UE; and at least one of the first waveform type is associated with the PUSCH communication; or the second waveform type is associated with the PUSCH communication.

Aspect 32 includes the method of any of aspects 25-31, further comprising receiving, from the UE, the PUSCH communication using the indicated waveform type and the scheduled resources.

Aspect 33 includes the method of any of aspects 25-32, wherein the DCI indicates scheduling information associated with a physical uplink shared channel (PUSCH) communication associated with the UE; and the scheduling information implicitly indicates at least one of the first waveform type is associated with the PUSCH communication; or the second waveform type is associated with the PUSCH communication.

Aspect 34 includes the method of any of aspects 25-33, wherein the bitfield of the DCI includes a column of a time domain resource allocation (TDRA) table.

Aspect 35 includes the method of any of aspects 25-34, wherein the bitfield of the DCI includes a column of a modulation and coding scheme (MCS) table.

Aspect 36 includes the method of any of aspects 25-35, wherein at least one of the size of the DCI is based on a format of the DCI; the size of the bitfield of the DCI is based on the format of the DCI; or the location of the bitfield of the DCI is based on the format of the DCI.

Aspect 37 includes the method of any of aspects 25-36, wherein the DCI maintains a same number of blind decodes per search space for a DCI associated with the first waveform and a DCI associated with the second waveform.

Aspect 38 includes a method of wireless communication performed by a network unit the method comprising transmitting, to a user equipment (UE), a first indicator indicating dynamic waveform switching between a first waveform type and a second waveform type; and transmitting, to the UE based on the first indicator, a second indicator indicating to switch between the first waveform type and the second waveform type.

Aspect 39 includes the method of 38, wherein the second indicator is non-uplink communication scheduling downlink control information (DCI).

Aspect 40 includes the method of any of aspects 38-39, wherein the second indicator is a medium access control control element (MAC-CE) communication.

Aspect 41 includes the method of any of aspects 38-40, wherein the transmitting the second indicator includes transmitting the second indicator on a semi-persistent basis.

Aspect 42 includes the method of any of aspects 38-41, further comprising transmitting, to the UE, downlink control information (DCI) indicating scheduled resources for a physical uplink shared channel (PUSCH) communication associated with the UE; and receiving, from the UE based on the second indicator, the PUSCH communication using the first waveform type or the second waveform type.

Aspect 43 includes the method of any of aspects 38-42, wherein size of the DCI is a first size of a DCI associated with the first waveform type; size of a bitfield of the DCI is a first size of a bitfield of the DCI associated with the first waveform type; and a location of the bitfield of the DCI is a first location of the bitfield of the DCI associated with the first waveform type.

Aspect 44 includes the method of any of aspects 38-43, wherein the second indicator indicates a blind decoding search space based on the first size of the DCI associated with the first waveform type.

Aspect 45 includes the method of any of aspects 38-44, wherein size of the DCI is a second size of a DCI associated with the second waveform type; size of a bitfield of the DCI is a second bitfield size of the DCI associated with the second waveform type; and a location of the bitfield of the DCI is a second location of the bitfield of the DCI associated with the second waveform type.

Aspect 46 includes the method of any of aspects 38-45, wherein the second indicator indicates a blind decoding search space based on the second size of the DCI associated with the second waveform type.

Aspect 47 includes the method of any of aspects 38-46, wherein the first waveform type includes a discrete Fourier transform spread orthogonal frequency division multiplexing (DFT-s-OFDM) waveform; and the second waveform type includes a cyclic-prefix OFDM (CP-OFDM) waveform.

Aspect 48 includes the method of any of aspects 38-47, wherein the transmitting the first indicator includes transmitting the first indicator via at least one of radio resource control (RRC) communication; or a medium access control control element (MAC-CE) communication.

Aspect 31 includes a non-transitory computer-readable medium storing one or more instructions for wireless communication, the one or more instructions comprising one or more instructions that, when executed by one or more processors of a user equipment (UE) cause the UE to perform any one of aspects 1-16.

Aspect 32 includes a non-transitory computer-readable medium storing one or more instructions for wireless communication, the one or more instructions comprising one or more instructions that, when executed by one or more processors of a network unit, cause the network unit to perform any one of aspects 17-30.

Aspect 33 includes a user equipment (UE) comprising one or more means to perform any one or more of aspects 1-13.

Aspect 34 includes a user equipment (UE) comprising one or more means to perform any one or more of aspects 14-24.

Aspect 35 includes a network unit comprising one or more means to perform any one or more of aspects 25-37.

Aspect 36 includes a network unit comprising one or more means to perform any one or more of aspects 38-48.

Aspect 37 includes a user equipment (UE) comprising a memory; a transceiver; and at least one processor coupled to the memory and the transceiver, wherein the UE is configured to perform any one or more of aspects 1-13.

Aspect 37 includes a user equipment (UE) comprising a memory; a transceiver; and at least one processor coupled to the memory and the transceiver, wherein the UE is configured to perform any one or more of aspects 14-24.

Aspect 38 includes a network unit comprising a memory; a transceiver; and at least one processor coupled to the memory and the transceiver, wherein the network unit is configured to perform any one or more of aspects 25-37.

Aspect 39 includes a network unit comprising a memory; a transceiver; and at least one processor coupled to the memory and the transceiver, wherein the network unit is configured to perform any one or more of aspects 38-48.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations may be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

receiving, from a network unit, an indicator via a radio resource control (RRC) message indicating dynamic waveform switching between a first waveform type and a second waveform type; and monitoring, based on the indicator, for downlink control information (DCI) from the network unit by maintaining a same number of blind decodes per search space for a DCI associated with the first waveform and a DCI associated with the second waveform, wherein at least one of a size of the DCI, a size of a bitfield of the DCI, or a location of the bitfield of the DCI is interpreted based on the indicator.

2. The method of claim 1, wherein:

the first waveform type includes a discrete Fourier transform spread orthogonal frequency division multiplexing (DFT-s-OFDM) waveform; and the second waveform type includes a cyclic-prefix OFDM (CP-OFDM) waveform.

3. The method of claim 1, wherein:

the DCI is associated with the first waveform type or the second waveform type; and the size of the DCI associated with the first waveform type is a same size as the size of the DCI associated with the second waveform type.

4. The method of claim 1, wherein:

the indicator further indicates the size of the DCI, the size of the DCI being a maximum size of a DCI associated with the first waveform type or a size of a DCI associated the second waveform type; and the monitoring for the DCI comprises monitoring for the DCI by blind decoding a search space based on the size of the DCI.

5. The method of claim 4, wherein the bitfield of the DCI comprises at least one zero padding bit.

6. The method of claim 1, further comprising:

receiving, from the network unit based on the monitoring, the DCI, wherein the DCI indicates:

scheduled resources for a physical uplink shared channel (PUSCH) communication associated with the UE; and at least one of:

the first waveform type is associated with the PUSCH communication; or the second waveform type is associated with the PUSCH communication.

7. The method of claim 6, further comprising transmitting, to the network unit, the PUSCH communication using the indicated waveform type and the scheduled resources.

8. The method of claim 1, further comprising:

receiving, from the network unit based on the monitoring, the DCI, wherein the DCI indicates:

scheduling information associated with a physical uplink shared channel (PUSCH) communication associated with the UE; and the scheduling information implicitly indicates at least one of:

the first waveform type is associated with the PUSCH communication; or the second waveform type is associated with the PUSCH communication.

9. The method of claim 1, further comprising:

receiving, from the network unit based on the monitoring, the DCI, wherein the bitfield of the DCI comprises a column of a time domain resource allocation (TDRA) table.

10. The method of claim 1, further comprising:

receiving, from the network unit based on the monitoring, the DCI, wherein the bitfield of the DCI comprises a column of a modulation and coding scheme (MCS) table.

11. The method of claim 1, wherein at least one of:

the size of the DCI is based on a format of the DCI;

the size of the bitfield of the DCI is based on the format of the DCI; or the location of the bitfield of the DCI is based on the format of the DCI.

12. A method of wireless communication performed by a network unit, the method comprising:

transmitting, to a user equipment (UE), an indicator via a radio resource control (RRC) message indicating dynamic waveform switching between a first waveform type and a second waveform type; and transmitting, to the UE based on the indicator, downlink control information (DCI), wherein at least one of a size of the DCI, a size of a bitfield of the DCI, or a location of the bitfield of the DCI is interpreted based on the indicator, and wherein the DCI maintains a same number of blind decodes per search space for a DCI associated with the first waveform and a DCI associated with the second waveform.

13. The method of claim 12, wherein:

the first waveform type includes a discrete Fourier transform spread orthogonal frequency division multiplexing (DFT-s-OFDM) waveform; and the second waveform type includes a cyclic-prefix OFDM (CP-OFDM) waveform.

14. The method of claim 12, wherein:

the DCI is associated with the first waveform type or the second waveform type; and the size of the DCI associated with the first waveform type is a same size as the size of the DCI associated with the second waveform type.

15. The method of claim 12, wherein:

the indicator further indicates the size of the DCI, the size of the DCI being a maximum size of a DCI associated with the first waveform type or a size of a DCI associated the second waveform type.

16. The method of claim 12, wherein the bitfield of the DCI comprises at least one zero padding bit.

17. The method of claim 12, wherein the DCI indicates:

scheduled resources for a physical uplink shared channel (PUSCH) communication associated with the UE; and at least one of:

the first waveform type is associated with the PUSCH communication; or the second waveform type is associated with the PUSCH communication.

18. The method of claim 17, further comprising receiving, from the UE, the PUSCH communication using the indicated waveform type and the scheduled resources.

19. The method of claim 12, wherein the DCI indicates:

scheduling information associated with a physical uplink shared channel (PUSCH) communication associated with the UE; and the scheduling information implicitly indicates at least one of:

the first waveform type is associated with the PUSCH communication; or the second waveform type is associated with the PUSCH communication.

20. The method of claim 12, wherein the bitfield of the DCI comprises a column of a time domain resource allocation (TDRA) table.

21. The method of claim 12, wherein the bitfield of the DCI comprises a column of a modulation and coding scheme (MCS) table.

22. The method of claim 12, wherein at least one of:

the size of the DCI is based on a format of the DCI;

the size of the bitfield of the DCI is based on the format of the DCI; or the location of the bitfield of the DCI is based on the format of the DCI.

23. A user equipment (UE) comprising:

a memory;

a transceiver; and at least one processor coupled to the memory and the transceiver, wherein the UE is configured to:

receive, from a network unit, an indicator via a radio resource control (RRC) message indicating dynamic waveform switching between a first waveform type and a second waveform type; and monitor, based on the indicator, for downlink control information (DCI) from the network unit by maintaining a same number of blind decodes per search space for a DCI associated with the first waveform and a DCI associated with the second waveform, wherein at least one of a size of the DCI, a size of a bitfield of the DCI, or a location of the bitfield of the DCI is interpreted based on the indicator.

24. The UE of claim 23, wherein:

the indicator further indicates the size of the DCI, the size of the DCI being a maximum size of a DCI associated with the first waveform type or a size of a DCI associated the second waveform type; and the monitoring for the DCI comprises monitoring for the DCI by blind decoding a search space based on the size of the DCI.

25. The UE of claim 23, wherein at least one of:

the size of the DCI is based on a format of the DCI;

the size of the bitfield of the DCI is based on the format of the DCI; or the location of the bitfield of the DCI is based on the format of the DCI.

26. The UE of claim 23, wherein:

the first waveform type includes a discrete Fourier transform spread orthogonal frequency division multiplexing (DFT-s-OFDM) waveform; and the second waveform type includes a cyclic-prefix OFDM (CP-OFDM) waveform.

27. The UE of claim 23, wherein:

the DCI is associated with the first waveform type or the second waveform type; and the size of the DCI associated with the first waveform type is a same size as the size of the DCI associated with the second waveform type.

28. A network unit comprising:

a memory;

a transceiver; and at least one processor coupled to the memory and the transceiver, wherein the network unit is configured to:

transmit, to a user equipment (UE), an indicator via a radio resource control (RRC) message indicating dynamic waveform switching between a first waveform type and a second waveform type; and transmit, to the UE based on the indicator, downlink control information (DCI), wherein at least one of a size of the DCI, a size of a bitfield of the DCI, or a location of the bitfield of the DCI is interpreted based on the indicator, and wherein the DCI maintains a same number of blind decodes per search space for a DCI associated with the first waveform and a DCI associated with the second waveform.

29. The network unit of claim 28, wherein:

the indicator further indicates the size of the DCI, the size of the DCI being a maximum size of a DCI associated with the first waveform type or a size of a DCI associated the second waveform type.

30. The network unit of claim 28, wherein at least one of:

the size of the DCI is based on a format of the DCI;

the size of the bitfield of the DCI is based on the format of the DCI; or the location of the bitfield of the DCI is based on the format of the DCI.

* * * * *